US011974557B2

(12) United States Patent
Milton

(10) Patent No.: US 11,974,557 B2
(45) Date of Patent: May 7, 2024

(54) ROTATABLE LINE TRANSFER MECHANISM FOR A FISHING REEL

(71) Applicant: James Edwards Milton, Malaga, NJ (US)

(72) Inventor: James Edwards Milton, Malaga, NJ (US)

( * ) Notice: Subject to any disclaimer, the term of this patent is extended or adjusted under 35 U.S.C. 154(b) by 0 days.

(21) Appl. No.: 18/174,659

(22) Filed: Feb. 27, 2023

(65) Prior Publication Data
US 2023/0270093 A1    Aug. 31, 2023

Related U.S. Application Data

(60) Provisional application No. 63/314,373, filed on Feb. 26, 2022.

(51) Int. Cl.
*A01K 89/01*        (2006.01)

(52) U.S. Cl.
CPC ...... *A01K 89/0102* (2013.01); *A01K 89/0108* (2013.01)

(58) Field of Classification Search
CPC ............ A01K 89/0102; A01K 89/0105; A01K 89/01121; A01K 89/011223; A01K 89/01126
See application file for complete search history.

(56) References Cited

U.S. PATENT DOCUMENTS

| | | | | |
|---|---|---|---|---|
| 3,061,230 A * | 10/1962 | Gayle | ................ | A01K 89/0102 242/244 |
| 3,296,731 A * | 1/1967 | Wood | ................ | A01K 89/0102 242/243 |
| 4,145,015 A * | 3/1979 | Noda | ................ | A01K 89/0102 242/237 |
| 5,149,010 A * | 9/1992 | Bacher | ............... | A01K 89/0102 242/312 |
| 6,000,652 A * | 12/1999 | Zwayer | ............. | A01K 89/0102 D22/140 |
| 6,641,070 B1 * | 11/2003 | Wong | ................ | A01K 89/0102 242/312 |
| 2017/0295768 A1 * | 10/2017 | Noble | ................... | F41B 5/1488 |
| 2021/0204533 A1 * | 7/2021 | Hayes | ............... | A01K 89/0102 |

* cited by examiner

*Primary Examiner* — Emmanuel M Marcelo
(74) *Attorney, Agent, or Firm* — Ashok Tankha

(57) ABSTRACT

A rotatable line transfer mechanism for a fishing reel includes a substantially hemispherical cap (SHC) and a securing mechanism. The SHC includes an outwardly curved hemispherical upper section (OCHUS) and a wall extending vertically downwards from a boundary of the OCHUS. The SHC includes a line flow slot extending from the wall to an apex of the OCHUS. The line flow slot receives and passes a fishing line from and to a spool. The securing mechanism is attachable to the SHC to rotatably secure the SHC to a fishing reel body. The rotatable line transfer mechanism is rotated about an axis of rotation of the spool in one direction to position the fishing line in a first end of the line flow slot during a retrieve mode, and in another direction to position the fishing line in a second end of the line flow slot during a cast mode.

18 Claims, 25 Drawing Sheets

ROTATABLE LINE TRANSFER MECHANISM FOR A FISHING REEL

CROSS-REFERENCE TO RELATED APPLICATIONS

This application claims priority to and the benefit of the provisional patent application titled "Rotatable Line Transfer Mechanism For A Fishing Reel", application No. 63/314,373, filed in the United States Patent and Trademark Office on Feb. 26, 2022. The specification of the above referenced patent application is incorporated herein by reference in its entirety.

FIELD OF THE INVENTION

The apparatus disclosed herein, in general, relates to a fishing reel. More particularly, the apparatus disclosed herein relates to a rotatable line transfer mechanism for a fishing reel, which can be rotated to selectively transfer a fishing line between a cast mode and a retrieve mode.

BACKGROUND

Fishing, also referred to as angling, is a sport of catching fish, typically using a fishing rod, a fishing reel, a fishing line, a hook, and a bait. An angler attaches a hook to a fishing line, which is attached to the fishing rod, typically fitted with a fishing reel. The fishing reel is typically attached proximal to a handle of the fishing rod. One type of fishing reel preferred by most anglers is a spinning reel. The spinning reel is configured with an open face and a bail. The spinning reel further comprises a fixed spool for holding the fishing line that is wound around a central axis of the spool, and a handle for retrieving the fishing line. An angler rotates the handle of the spinning reel to retrieve the fishing line. The spinning reel further comprises a reel body which is composed of a foot and a gear box housing. The gear box housing accommodates a gear box that is coupled to the handle and a spindle. The gear box is configured to amplify the number of spindle rotations for each rotation of the handle. The spool stays stationary on the spindle during casting of the fishing line. The gear box rotates the bail when the fishing line is retrieved. The bail wraps the fishing line around the stationary spool. An angler casts the fishing line by grasping the fishing line with a forefinger against the handle of the fishing rod, opening the bail, and then performing a backward swing of the fishing rod followed by a forward cast while releasing the fishing line with the forefinger. During the retrieve, the angler operates the handle of the spinning reel with one hand, while the large rotating bail serves as a line pickup, restoring the fishing line to its original position on the spool. When the fishing line is wound on the spool by the rotating bail, the fishing line undergoes a change of direction, and thereby imparts a twist to the fishing line. The fishing line, thus being twisted, with an indirect line takeup, eventually results in undesirable snarls in the fishing line, requiring more frequent line replacement.

The design of conventional spinning reels exhibits a tendency to twist and untwist the fishing line as the fishing line is cast and retrieved. The spool is typically the point of a conventional spinning reel where the fishing line is most prone to twist or tangle. Substantial friction on the fishing line by the spool results in breakage of the fishing line. Moreover, improper winding of the fishing line onto the spool by the rotating bail causes the fishing line to be trapped underneath itself on the spool or even detach from the spinning reel in loose loops of fishing line. Conventional direct-to-reel spool retrieve type reels, also referred to as conventional or bait casting reels, have a limited ability to freely cast bait. Direct-to-reel line retrieval imparts no line twist, which is preferred for reeling in fish. The spinning reel changes the direction of the fishing line when the fishing line is being wound onto the spool of the spinning reel, thereby imparting a line twist. If an angler turns the handle of the spinning reel while encountering large fish with much resistance, the fishing line typically twists into an uncontrollable snarl that eventually ruins the fishing line. Over a period of time, casting and retrieving the fishing line accumulates more and more twist, because the angler has no method of countering the accumulation of the twist of the fishing line, thereby ruining and rendering the fishing line unusable.

Hence, there is a long-felt need for a rotatable line transfer mechanism configured to be attached to a fishing reel of a fishing rod, for selectively transferring a fishing line between a cast mode and a retrieve mode with no change in the direction of the fishing line to preclude a line twist or a line entanglement during retrieve mode when the fishing line is under tension and vulnerable to twist. Moreover, there is a need for a rotatable line transfer mechanism that ensures there is no friction of the fishing line on any part of the fishing reel or in the flow of the fishing line during casting and retrieving of the fishing line, thereby imparting no line twist and precluding entanglement of the fishing line. Furthermore, there is a need for a rotatable line transfer mechanism that ensures that, during the retrieve, the fishing line travels from the fishing rod in towards the fishing reel in a substantially straight line to the edge of the spool of the fishing reel on which the fishing line is being wound with no redirection.

SUMMARY OF THE INVENTION

This summary is provided to introduce a selection of concepts in a simplified form that are further disclosed in the detailed description of the invention. This summary is not intended to determine the scope of the claimed subject matter.

The apparatus disclosed herein addresses the above-recited need for a rotatable line transfer mechanism configured to be attached to a fishing reel of a fishing rod, for selectively transferring a fishing line between a cast mode and a retrieve mode with no change in the direction of the fishing line thereby precluding a line twist or a line entanglement during retrieve when the fishing line is under tension and vulnerable to twist. The rotatable line transfer mechanism disclosed herein ensures there is no friction of the fishing line on any part of the fishing reel or in the flow of the fishing line during casting and retrieving of the fishing line, thereby precluding line twist and precluding entanglement of the fishing line. The rotatable line transfer mechanism also ensures that, during the retrieve, the fishing line travels from the fishing rod in towards the fishing reel in a substantially straight line with respect to the edge of a spool of the fishing reel on which the fishing line is being wound with no redirection. The fishing reel with the line transfer mechanism disclosed herein is configured to create a direct-to-spool retrieve and a smooth flow of the fishing line off the end of the spool while casting.

The rotatable line transfer mechanism for the fishing reel comprises a substantially hemispherical cap and a securing mechanism. The substantially hemispherical cap comprises an outwardly curved hemispherical upper section and a wall extending vertically downwards from a boundary of the outwardly curved hemispherical upper section. The substantially hemispherical cap comprises a line flow slot extending from the wall to an apex of the outwardly curved hemispherical upper section. The line flow slot is configured to receive and pass a fishing line from and to a spool of the fishing reel. Furthermore, the substantially hemispherical cap comprises a cavity configured to partially encapsulate the spool. The securing mechanism is configured to be attached to the substantially hemispherical cap to rotatably secure the substantially hemispherical cap to a reel body of the fishing reel. The rotatable line transfer mechanism is configured to be rotated about an axis of rotation of the spool in a first direction to position the fishing line in a first end of the line flow slot during the retrieve mode. Furthermore, the rotatable line transfer mechanism is configured to be rotated about the axis of rotation of the spool in a second direction opposite to the first direction to position the fishing line in a second end of the line flow slot during a cast mode. In an embodiment, the rotatable line transfer mechanism is rotated in a clockwise direction about the axis of rotation of the spool to position the fishing line in the first end of the line flow slot during the retrieve mode. In an embodiment, the rotatable line transfer mechanism is rotated in a counterclockwise direction about the axis of rotation of the spool to position the fishing line in the second end of the line flow slot during the cast mode. Positioning the line in the second end of the line flow slot allows the line to be substantially frictionlessly unwound from the spool.

In an embodiment, the line flow slot of the substantially hemispherical cap comprises a first section extending from the wall of the substantially hemispherical cap to the boundary of the outwardly curved hemispherical upper section and defining a backwardly slanted L-shape. In this embodiment, the line flow slot further comprises a second section extending from the apex of the outwardly curved hemispherical upper section to the boundary of the outwardly curved hemispherical upper section and defining an inverted backwardly slanted L-shape. The first end of the line flow slot is disposed in the first section of the line flow slot and the second end of the line flow slot is disposed in the second section of the line flow slot. In an embodiment, the first end and the second end of the line flow slot are rounded. In an embodiment, the line flow slot extends from a mid-section of the wall of the substantially hemispherical cap to the apex of the outwardly curved hemispherical upper section of the substantially hemispherical cap. In an embodiment, the line flow slot is configured to allow the spool to unwind in the second direction in a free flow manner during the cast mode.

In an embodiment, the securing mechanism comprises a generally cylindrical receptacle configured to be disposed underneath the reel body of the fishing reel. In an embodiment, a top portion of the generally cylindrical receptacle is coplanar with an upper surface of the reel body when the generally cylindrical receptacle is disposed underneath the reel body of the fishing reel. The substantially hemispherical cap and the generally cylindrical receptacle are configured to encapsulate the reel body and the spool when the substantially hemispherical cap is positioned over the spool and attached to the generally cylindrical receptacle.

In an embodiment, the generally cylindrical receptacle of the securing mechanism comprises an annular opening at a base of the generally cylindrical receptacle. The annular opening is substantially concentric with the generally cylindrical receptacle. Furthermore, in an embodiment, a circumference of the annular opening is less than a circumference of the generally cylindrical receptacle. Furthermore, in an embodiment, the circumference of the annular opening is less than a circumference of the spool. In an embodiment, the generally cylindrical receptacle comprises a wall surrounding the base of the generally cylindrical receptacle. Furthermore, in an embodiment, an inner top portion of the wall of the generally cylindrical receptacle comprises threads sized and configured to interact with threads configured on an outer bottom portion of the wall of the substantially hemispherical cap. The threads on the inner top portion of the wall of the generally cylindrical receptacle are configured to cooperate mechanically with the threads on the outer bottom portion of the wall of the substantially hemispherical cap to thread the substantially hemispherical cap onto the generally cylindrical receptacle and effect a secure attachment between the substantially hemispherical cap and the generally cylindrical receptacle.

In an embodiment, the rotatable line transfer mechanism further comprises a ring configured to be accommodated between the generally cylindrical receptacle and the reel body. In an embodiment, an outer diameter of the ring is either less than or equal to an inner diameter of the wall of the generally cylindrical receptacle. In an embodiment, the ring is attached to the wall of the generally cylindrical receptacle. For example, an outer perimeter of the ring is attached to an inner perimeter of the wall of the generally cylindrical receptacle. In another embodiment, the ring is attached to the reel body. For example, an inner perimeter of the ring is attached to an outer perimeter of the reel body. The ring is configured to hold the substantially hemispherical cap rigidly in place on the reel body when the substantially hemispherical cap is positioned on the reel body and attached to the generally cylindrical receptacle. In an embodiment, the substantially hemispherical cap is attached to the generally cylindrical receptacle using an adhesive. In another embodiment, the substantially hemispherical cap is threadably engaged with the generally cylindrical receptacle to attach the generally cylindrical receptacle to the substantially hemispherical cap.

In another embodiment of the rotatable line transfer mechanism, the securing mechanism comprises a generally cylindrical receptacle integrated to the reel body of the fishing reel. The generally cylindrical receptacle that is integrated to the reel body comprises a base comprising an upper base portion disposed proximal to a boundary of the base, a lower base portion disposed at a center or a mid-section of the base, and an inwardly tapering mid-section disposed between the upper base portion and the lower base portion. The generally cylindrical receptacle integrated to the reel body further comprises a generally cylindrical wall surrounding the boundary of the base; a cavity defined by the base and the generally cylindrical wall and configured to accommodate a system of gears of the fishing reel; and an opening configured in the lower base portion of the base, proximal to the inwardly tapering mid-section of the base, to accommodate a gear axle of the system of gears.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein.

DETAILED DESCRIPTION OF THE INVENTION

Figure 1A:
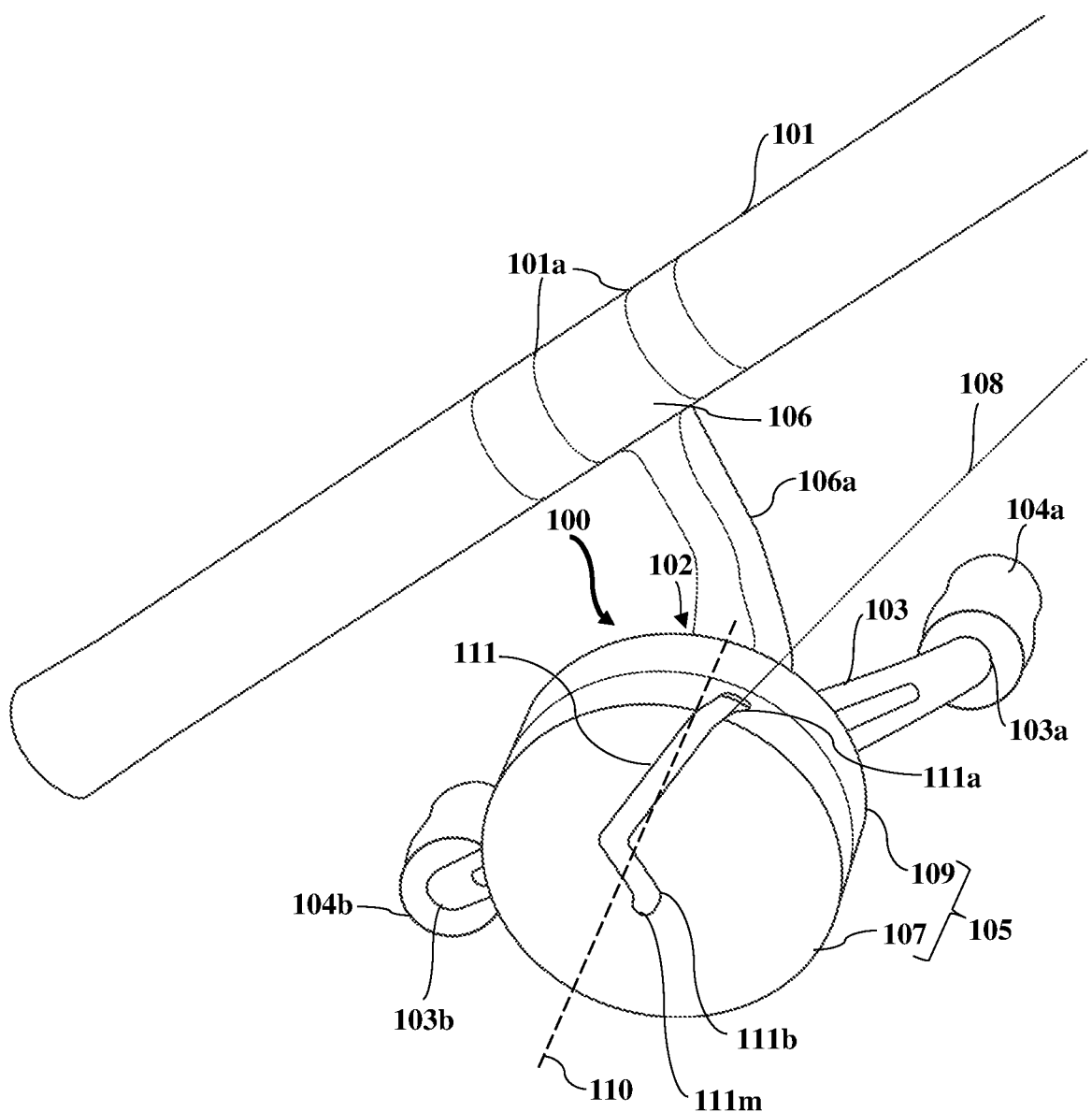
FIG. 1A exemplarily illustrates a perspective view of an embodiment of a rotatable line transfer mechanism affixed to a fishing reel of a fishing rod, where the rotatable line transfer mechanism is configured in a retrieve mode.
Figure 1B:
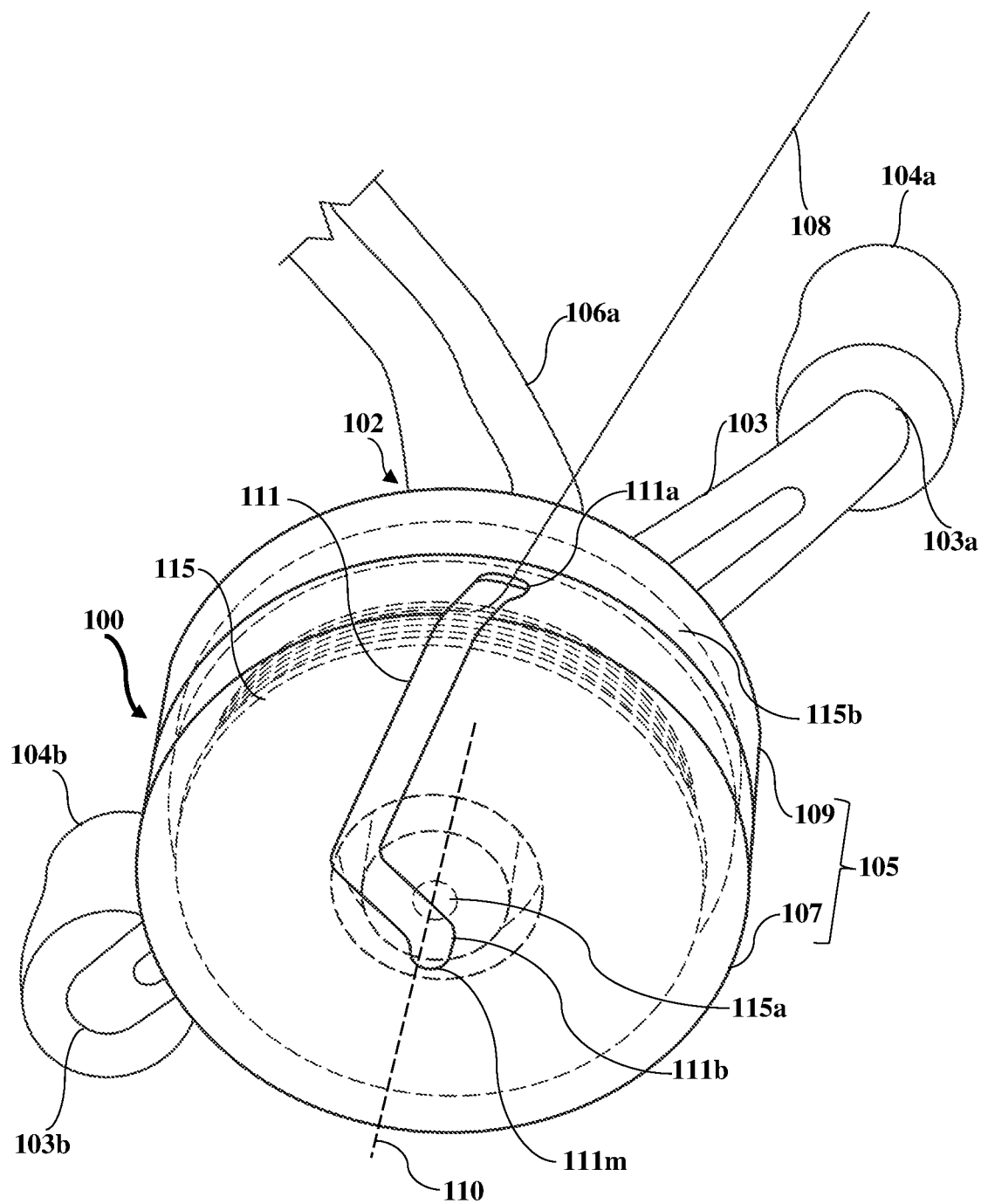
FIG. 1B exemplarily illustrates another perspective view of the embodiment of the rotatable line transfer mechanism shown in FIG. 1A, showing parts of the fishing reel encapsulated by the rotatable line transfer mechanism.

FIG. 1A exemplarily illustrates a perspective view of an embodiment of a rotatable line transfer mechanism 105 affixed to a fishing reel 100 of a fishing rod 101. The rotatable line transfer mechanism 105 shown in FIG. 1A is configured in a retrieve mode. As used herein, "retrieve mode" refers to a mode of reeling in a fishing line 108 with a bait, a lure, or a hooked fish from the water using the fishing rod 101 and the fishing reel 100 during fishing or angling. In the retrieve mode, the fishing line 108 is rewound around a spool 115 of the fishing reel 100 illustrated in FIG. 1B. FIG. 1B exemplarily illustrates another perspective view of the embodiment of the rotatable line transfer mechanism 105 shown in FIG. 1A, showing parts of the fishing reel 100 encapsulated by the rotatable line transfer mechanism 105. The rotatable line transfer mechanism 105 also operates in a cast mode as illustrated in FIG. 6C. As used herein, "cast mode" refers to a mode of throwing or hurling the fishing line 108 with a bait or a lure over water using the fishing rod 101 and the fishing reel 100 during fishing or angling. In the cast mode, the fishing line 108 is unwound from the spool 115 of the fishing reel 100.

Figure 6A:
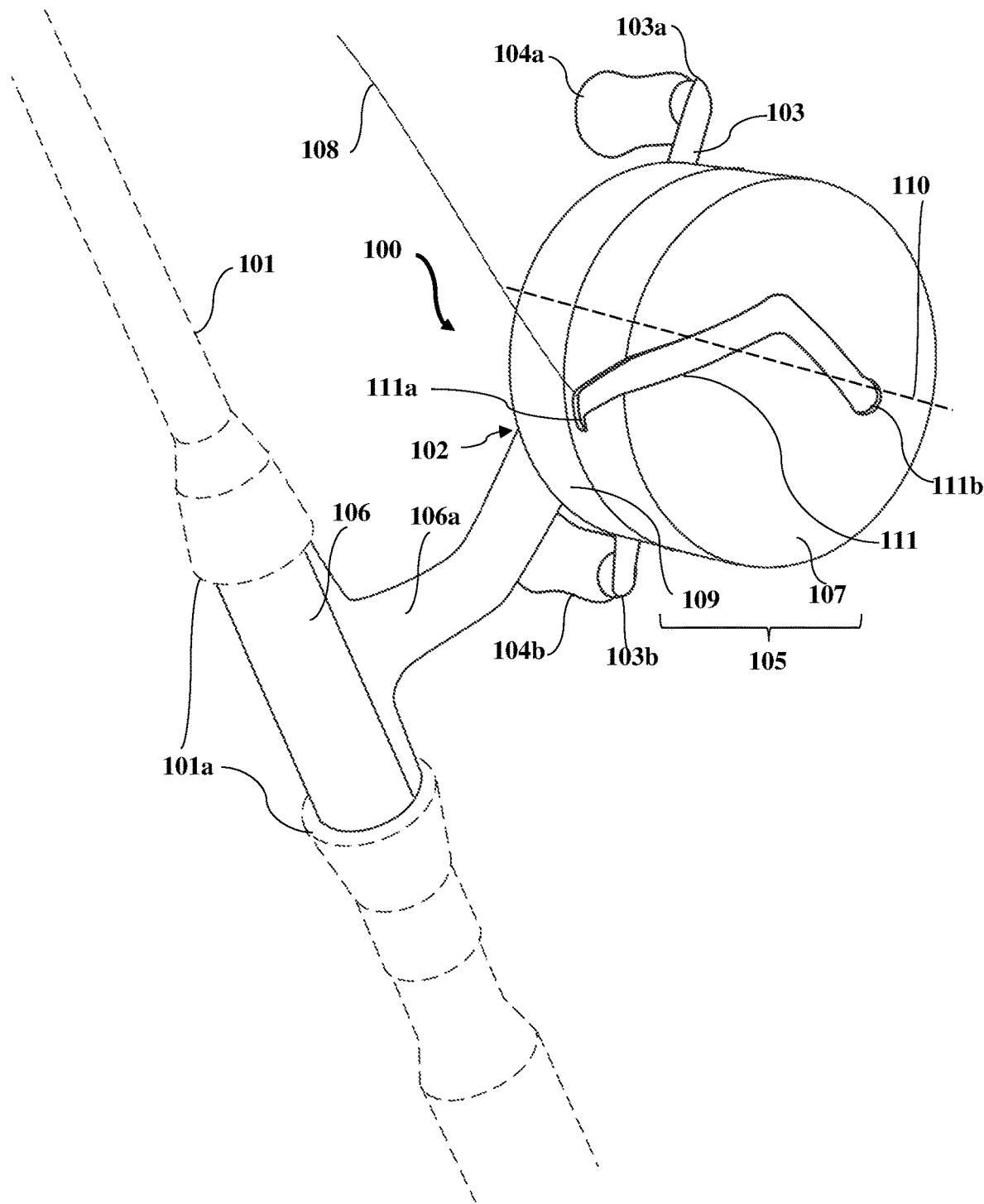
FIG. 6A exemplarily illustrates a top perspective view of a fishing reel of a fishing rod using the embodiment of the rotatable line transfer mechanism shown in FIGS. 1A-3G, in a retrieve mode.
Figure 6B:
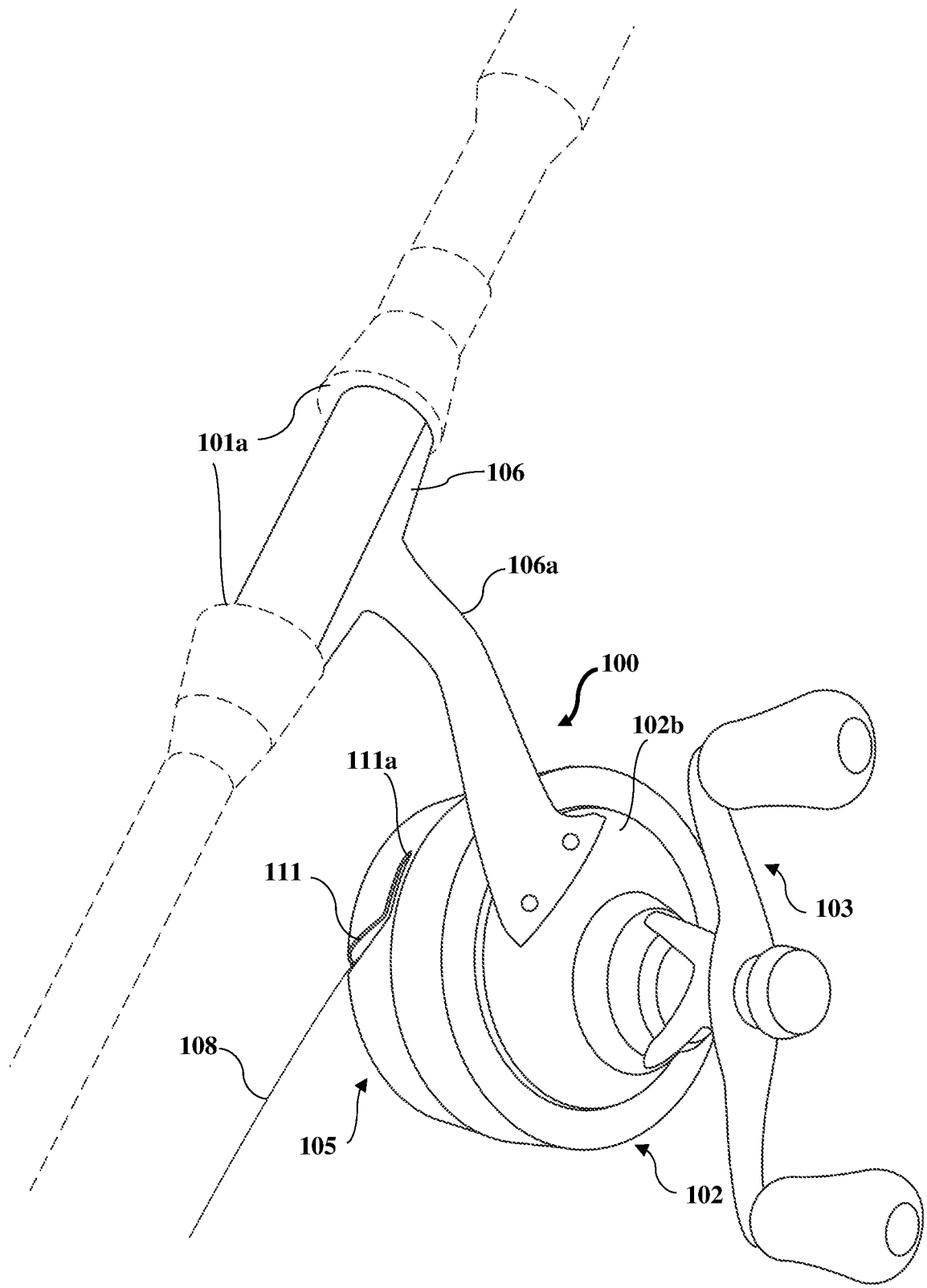
FIG. 6B exemplarily illustrates a bottom perspective view of the fishing reel of the fishing rod shown in FIG. 6A.
Figure 6C:
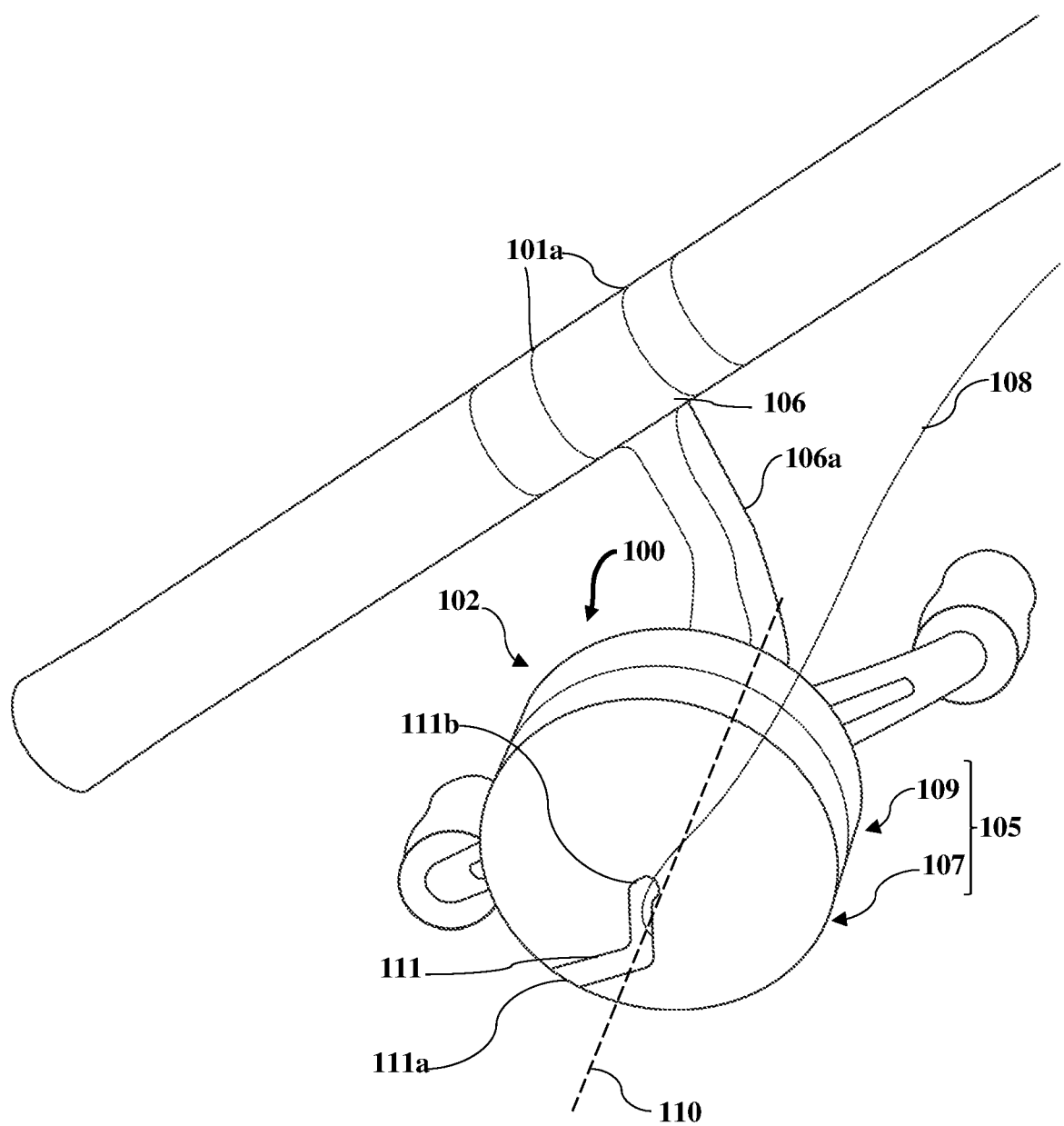
FIG. 6C exemplarily illustrates a perspective view of the fishing reel of the fishing rod using the embodiment of the rotatable line transfer mechanism shown in FIGS. 1A-3G, in a cast mode.

FIGS. 3A-3C and FIGS. 9-11 exemplarily illustrate the fishing reel 100 for selectively transferring the fishing line 108 between the cast mode and the retrieve mode comprises a reel body 102, a spool 115, and a rotatable line transfer mechanism 105 as illustrated in FIGS. 1A-1B and FIGS. 6A-6C. The reel body 102 is the primary component of the fishing reel 100. The reel body 102 houses the spool 115, a system 301 of gears, the rotatable line transfer mechanism 105, etc., of the fishing reel 100. The reel body 102 is made, for example, from any one of graphite, plastic, metals such as aluminum, stainless steel, etc. The reel body 102 is configured to be attached to the fishing rod 101 via a reel foot 106 as illustrated in FIG. 1A and FIGS. 6A-6C. The reel foot 106 is a bridging element between the fishing reel 100 and the fishing rod 101. A stem 106a of the reel foot 106 extends from the reel body 102 and rigidly secures the reel foot 106 into a seat 101a configured in the fishing rod 101. The reel foot 106 is rigidly attached to the seat 101a configured in the fishing rod 101. In an embodiment, the stem 106a of the reel foot 106 is attached to a bottom surface 102b of the reel body 102 as illustrated in FIG. 6B, using fasteners, for example, screws, and extends therefrom to rigidly fit the reel foot 106 into the seat 101a of the fishing rod 101. In an embodiment, the reel foot 106 is generally rectangularly shaped for firm placement in and rigid attachment to the seat 101a of the fishing rod 101. In another embodiment, the reel foot 106 is molded to the reel body 102 as an extension of the reel body 102 and is made of the same material, for example, any one of graphite, plastic, metals such as aluminum, stainless steel, etc., as that of the reel body 102. The rigid attachment of the reel foot 106 from the reel body 102 to the fishing rod 101 via the stem 106a allows the reel body 102 and the fishing rod 101 to remain firm during a swift action in the cast mode and to withstand tension of a hooked fish in the retrieve mode.

Figure 3A:
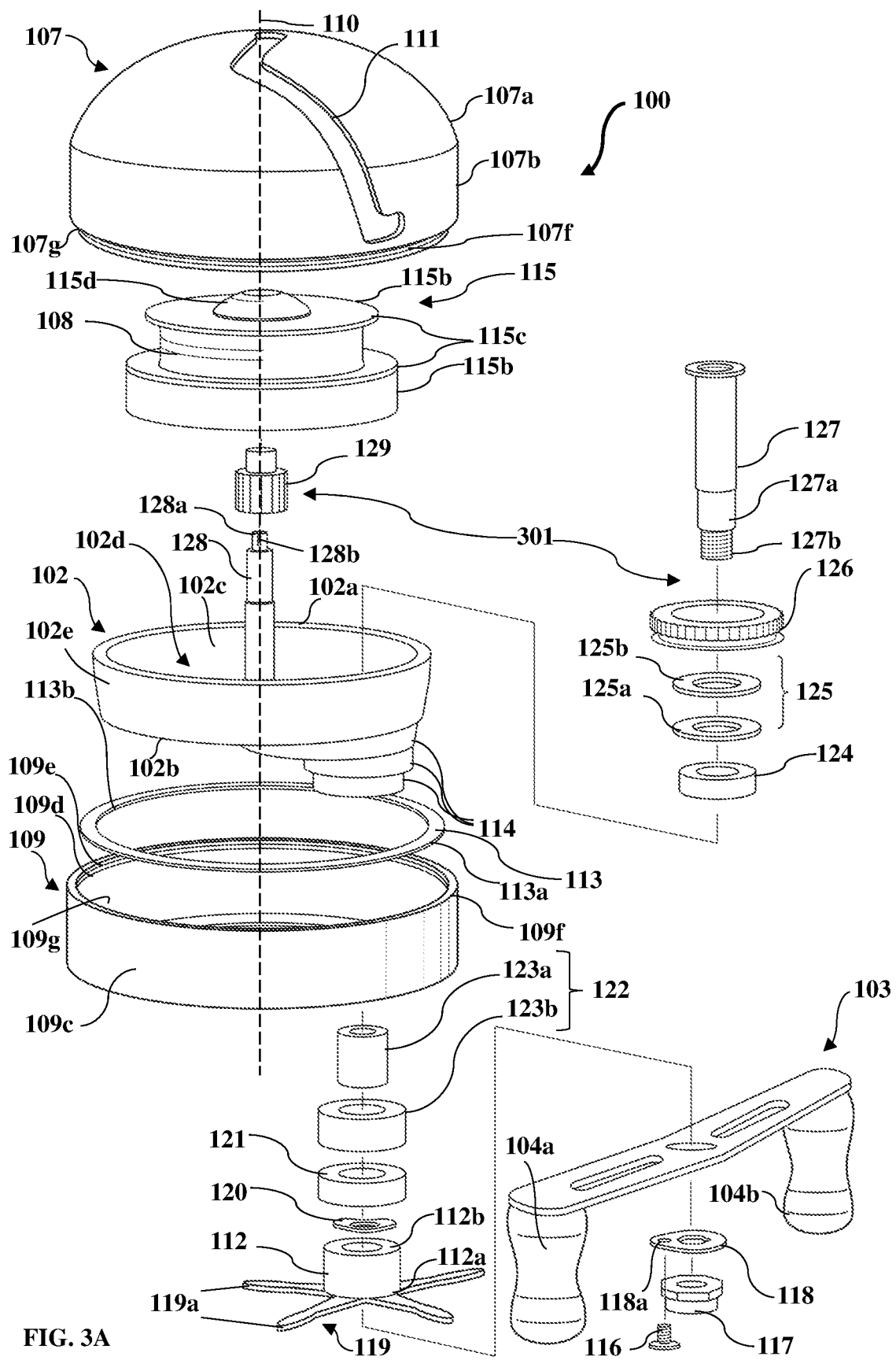
FIG. 3A exemplarily illustrates an exploded view of an embodiment of a fishing reel comprising the embodiment of the rotatable line transfer mechanism illustrated in FIGS. 1A-2F, showing a ring suspended between a reel body and the generally cylindrical receptacle.
Figure 3B:
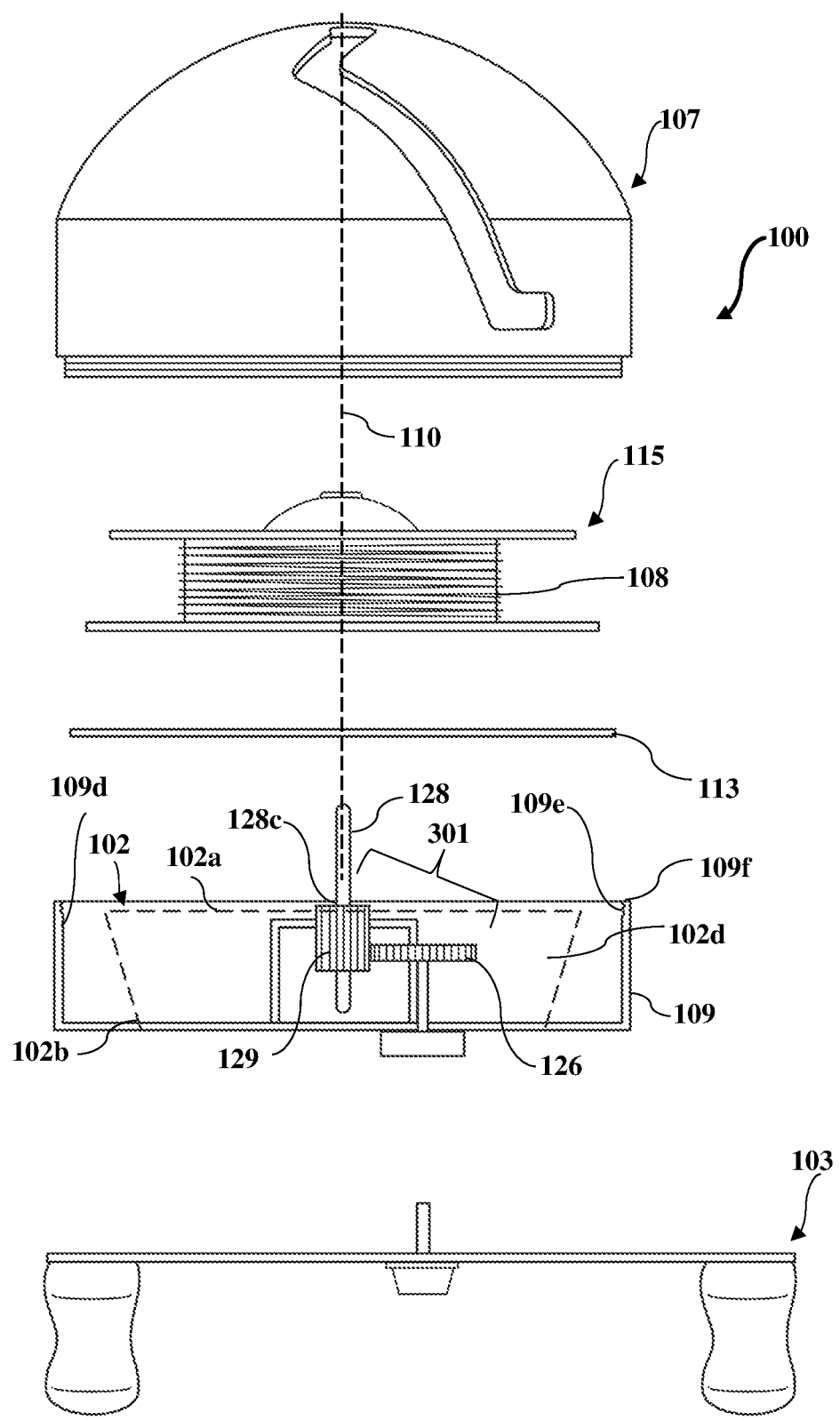
FIG. 3B exemplarily illustrates a partially assembled view of an embodiment of the fishing reel, comprising the embodiment of the rotatable line transfer mechanism illustrated in FIGS. 1A-2F.

The spool 115 illustrated in FIG. 1B, is disposed on the reel body 102 as disclosed in the descriptions of FIGS. 3A-3F. The spool 115 holds the fishing line 108, for example, a monofilament fishing line or a fluorocarbon fishing line. The spool 115 is made, for example, from anodized aluminum, graphite, etc. The fishing line 108 is wound around the spool 115. In an embodiment, the spool 115 has a substantially large diameter providing for less coiling memory, thereby allowing the fishing line 108 to flow smoothly while being cast from the spool 115. In an example, the diameter of the spool 115 ranges from about 3 inches to about 4 inches in freshwater applications. For saltwater applications that require larger spools, the diameter of the spool 115 is configured to be, for example, equal to or larger than about 6 inches without causing balance and size problems that would be associated with other types of reels using a 6-inch plus size spool. In this embodiment, the reel body 102 and the spool 115 are configured to be disposed in line with the fishing rod 101 as exemplarily illustrated in FIG. 1A and FIGS. 6A-6C, thereby allowing accommodation of a spool 115 with a substantially large diameter. During operation, the reel body 102 and the spool 115 are aligned parallel to the fishing rod 101, such that a turning handle 103 is disposed on one surface, for example, the bottom surface 102b, of the reel body 102 and the spool 115 is disposed on an upper surface 102a of the reel body 102 as illustrated in FIGS. 3A-3B.

As exemplarily illustrated in FIGS. 3A-3C and FIGS. 9-11, the turning handle 103 is rotatably connected to the spool 115 via the system 301 of gears accommodated in the reel body 102. The turning handle 103 is made, for example, from stainless steel, aluminum, graphite, etc. The turning handle 103 is operably coupled to the system 301 of gears housed in the reel body 102 via a pivot 112 illustrated in FIG. 3A and FIG. 3C. The pivot 112 is a short shaft about which the turning handle 103 rotates. The turning handle 103 is configured to turn the system 301 of gears selected to achieve a desired gear ratio N:1, where "N" is the number of rotations per single turn of the turning handle 103. The desired gear ratio is, for example, between 2.5:1 and 5.5:1. The gear ratio is determined by an individual angler's preference and the size of the spool 115 that is used in the fishing reel 100. A lower gear ratio is configured for a larger spool causing a faster retrieve of the fishing line 108. The system 301 of gears is selected based on an optimal number of rotations of the spool 115 that a single rotation of the turning handle 103 is required to deliver. The system 301 of gears is operably connected to the spool 115. An operator of the fishing reel 100, for example, an angler, rotates the turning handle 103 by holding hand grips 104a and 104b attached to opposing ends 103a and 103b of the turning handle 103, respectively. The turning handle 103 is rotated manually by hand to retrieve the fishing line 108 back to the fishing rod 101 after casting the fishing line 108.

As illustrated in FIGS. 1A, 1B, 2A, 2C-2I, and 3A-3G, the rotatable line transfer mechanism 105 for the fishing reel 100 comprises a substantially hemispherical cap 107 and a securing mechanism, for example, 109. The substantially hemispherical cap 107 comprises a line flow slot 111 configured to receive and pass the fishing line 108 from and to the spool 115. The securing mechanism is configured to be attached to the substantially hemispherical cap 107 to rotatably secure the substantially hemispherical cap 107 to the reel body 102 of the fishing reel 100. In an embodiment, the securing mechanism comprises a generally cylindrical receptacle 109 configured to be disposed underneath the reel body 102 of the fishing reel 100. As illustrated in FIG. 1B, the substantially hemispherical cap 107 and the generally cylindrical receptacle 109 are configured to encapsulate the reel body 102 and the spool 115 when the substantially hemispherical cap 107 is positioned over the spool 115 and attached to the generally cylindrical receptacle 109 that is disposed underneath the reel body 102 of the fishing reel 100. The rotatable line transfer mechanism 105 is configured to be rotated about an axis 110 of rotation of the spool 115 in a first direction, for example, a clockwise direction, to position the fishing line 108 in a first end 111a of the line flow slot 111 during the retrieve mode, and in a second direction, for example, a counterclockwise direction, opposite to the first direction to position the fishing line 108 in a second end 111b of the line flow slot 111 during the cast mode. In an embodiment as illustrated in FIGS. 1A-1B, the second end 111b of the line flow slot 111 comprises a supplementary rounded portion 111m, in the shape of a semicircle, that extends downward from the second end 111b. The second end 111b and the supplementary rounded portion 111m are configured to align with a center 115a of the spool 115 as illustrated in FIG. 1B, to allow the fishing line 108 to be substantially frictionlessly unwound from the spool 115 in the cast mode.

Figure 2B:
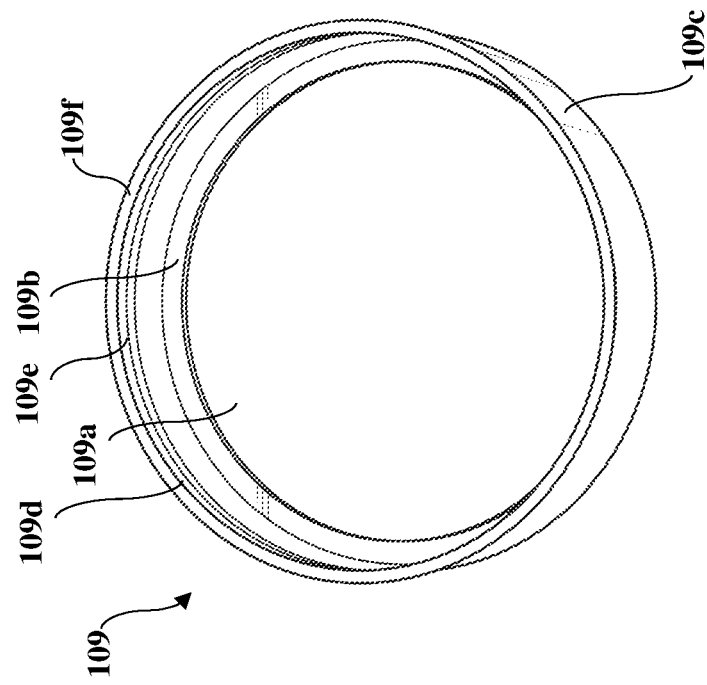
FIG. 2B exemplarily illustrates a top perspective view of an embodiment of a securing mechanism of the rotatable line transfer mechanism shown in FIGS. 1A-1B, where the securing mechanism comprises a generally cylindrical receptacle.
Figure 2A:
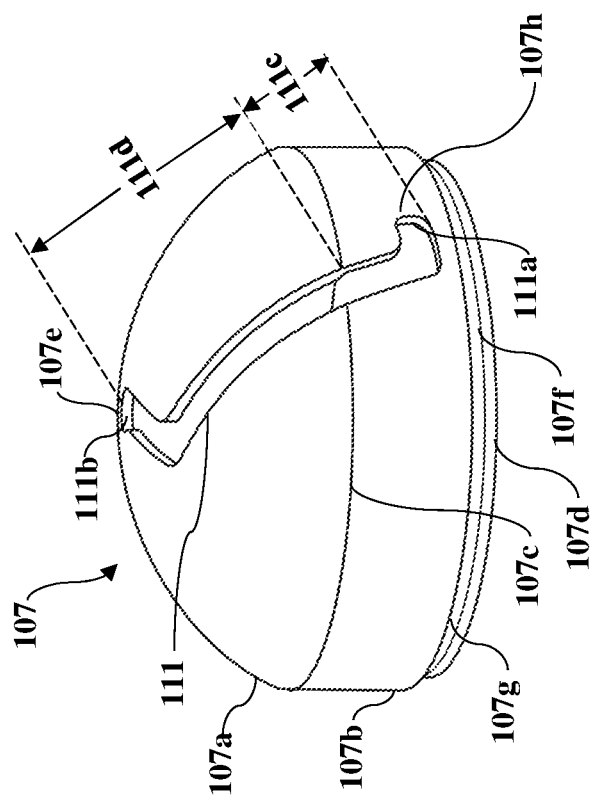
FIG. 2A exemplarily illustrates a top perspective view of an embodiment of a substantially hemispherical cap of the rotatable line transfer mechanism shown in FIGS. 1A-1B.
Figure 2C:
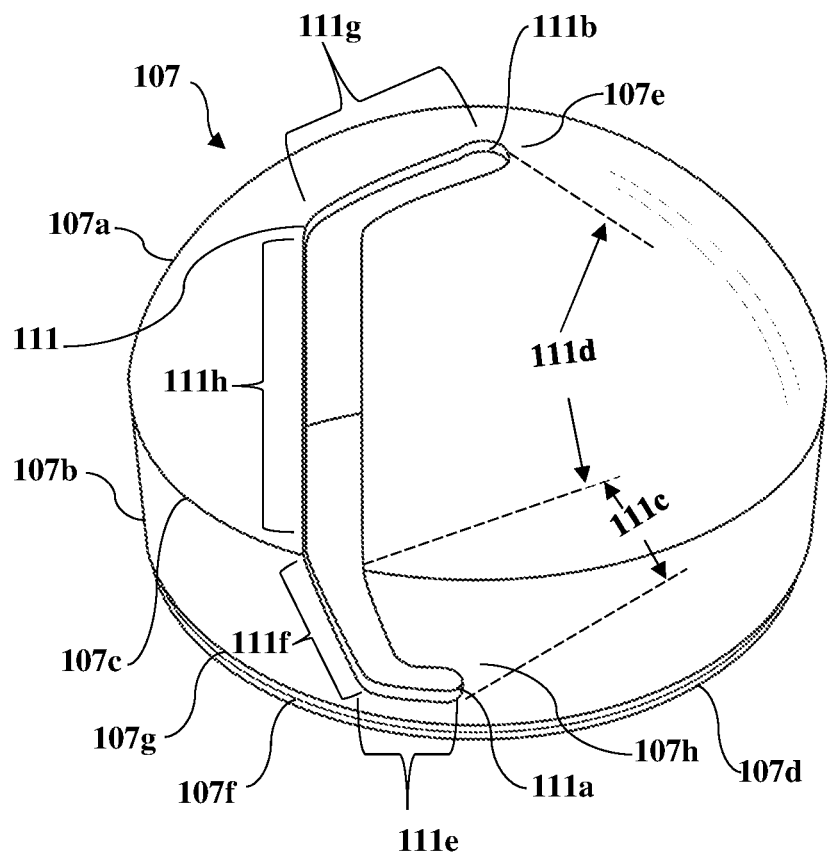
FIG. 2C exemplarily illustrates a top perspective view of the substantially hemispherical cap of the embodiment of the rotatable line transfer mechanism shown in FIGS. 1A-1B, showing a line flow slot in the substantially hemispherical cap.

FIG. 2A exemplarily illustrates a top perspective view of an embodiment of the substantially hemispherical cap 107 of the rotatable line transfer mechanism 105 shown in FIGS. 1A-1B. The substantially hemispherical cap 107 comprises an outwardly curved hemispherical upper section 107a and a wall 107b extending vertically downwards from a boundary 107c of the outwardly curved hemispherical upper section 107a. The substantially hemispherical cap 107 comprises the line flow slot 111 extending from the wall 107b to an apex 107e of the outwardly curved hemispherical upper section 107a. The line flow slot 111 is configured to receive and pass the fishing line 108 illustrated in FIGS. 1A-1B, from and to the spool 115. In an embodiment as illustrated in FIG. 2A, the line flow slot 111 comprises a first section 111c extending from the wall 107b to the boundary 107c of the outwardly curved hemispherical upper section 107a of the substantially hemispherical cap 107. The first section 111c of the line flow slot 111 defines a backwardly slanted L-shape as illustrated in FIG. 2A. The line flow slot 111 further comprises a second section 111d extending from the apex 107e of the outwardly curved hemispherical upper section 107a to the boundary 107c of the outwardly curved hemispherical upper section 107a. The second section 111d defines an inverted backwardly slanted L-shape as illustrated in FIG. 2A. The first end 111a of the line flow slot 111 is disposed in the first section 111c of the line flow slot 111 and the second end 111b of the line flow slot 111 is disposed in the second section 111d of the line flow slot 111. In an embodiment, an angle between a shorter side 111e and a longer side 111f of the backwardly slanted L-shape in the first section 111c of the line flow slot 111 illustrated in FIG. 2C, is an obtuse angle. In an embodiment, the obtuse angle between the shorter side 111e and the longer side 111f of the backwardly slanted L-shape in the first section 111c of the line flow slot 111 is, for example, about 109.77 degrees, as illustrated in FIG. 2C and FIG. 2G. In an embodiment, the line flow slot 111 has an alternative shape and still performs the task of moving the fishing line 108 from the first end 111a to the second end 111b and vice versa. For example, the alternative shape of the line flow slot 111 is straight or of a spiral track.

FIG. 2B exemplarily illustrates a top perspective view of an embodiment of the securing mechanism of the rotatable line transfer mechanism 105 shown in FIGS. 1A-1B, where the securing mechanism comprises a generally cylindrical receptacle 109. The generally cylindrical receptacle 109 is configured to be disposed underneath the reel body 102 of the fishing reel 100 as illustrated in FIG. 1B and FIGS. 3A-3C. In an embodiment, a top portion 109f of the generally cylindrical receptacle 109 is coplanar with the upper surface 102a of the reel body 102, when the generally cylindrical receptacle 109 is disposed underneath the reel body 102 of the fishing reel 100.

In an embodiment as illustrated in FIG. 2B, the generally cylindrical receptacle 109 comprises an annular opening 109a at a base 109b of the generally cylindrical receptacle 109. The annular opening 109a is substantially concentric with the generally cylindrical receptacle 109. Furthermore, in an embodiment, a circumference of the annular opening 109a is less than a circumference of the generally cylindrical receptacle 109. Furthermore, in an embodiment, the circumference of the annular opening 109a is less than a circumference of the spool 115 of the fishing reel 100 illustrated in FIG. 1B. The generally cylindrical receptacle 109 comprises a wall 109c surrounding the base 109b of the generally cylindrical receptacle 109. Furthermore, in an embodiment, an inner top portion 109d of the wall 109c of the generally cylindrical receptacle 109 comprises threads 109e sized and configured to interact with threads 107f configured on an outer bottom portion 107g of the wall 107b of the substantially hemispherical cap 107. The threads 109e on the inner top portion 109d of the wall 109c of the generally cylindrical receptacle 109 are configured to cooperate mechanically with the threads 107f on the outer bottom portion 107g of the wall 107b of the substantially hemispherical cap 107 to thread the substantially hemispherical cap 107 onto the generally cylindrical receptacle 109 and effect a secure attachment between the substantially hemispherical cap 107 and the generally cylindrical receptacle 109.

In an embodiment, one of the substantially hemispherical cap 107 and the generally cylindrical receptacle 109 comprises either snap joints or a slot and pin joint instead of threads 107f and 109e illustrated in FIG. 2A and FIG. 2B, respectively. For example, the substantially hemispherical cap 107 comprises multiple cantilever snap fit protrusions (not shown) projecting downward from a base 107d of the substantially hemispherical cap 107. The cantilever snap fit protrusions are configured to surround the generally cylindrical receptacle 109 and lock on to grooves (not shown) on the generally cylindrical receptacle 109.

FIG. 2C exemplarily illustrates a top perspective view of the substantially hemispherical cap 107 of the embodiment of the rotatable line transfer mechanism 105 shown in FIGS. 1A-1B, showing the line flow slot 111 in the substantially hemispherical cap 107. In an embodiment, the first end 111a and the second end 111b of the line flow slot 111 are rounded as illustrated in FIG. 2C, to allow the fishing line 108 to flow smoothly while being cast from the spool 115, and also to allow the fishing line 108 to be rewound around the spool 115 of the fishing reel 100 during the retrieve mode. In an embodiment, the line flow slot 111 extends from about a mid-section 107h of the wall 107b of the substantially hemispherical cap 107 to the apex 107e of the outwardly curved hemispherical upper section 107a of the substantially hemispherical cap 107. In an embodiment, an angle between the shorter side 111g and the longer side 111h of the backwardly slanted L-shape in the second section 111d of the line flow slot 111 is an obtuse angle. In an embodiment, the obtuse angle between the shorter side 111e and the longer side 111f of the backwardly slanted L-shape in the first section 111c of the line flow slot 111 is, for example, about 109.77 degrees, as illustrated in FIG. 2G.

As illustrated in FIG. 2C, the longer side 111h of the backwardly slanted L-shape in the second section 111d extends from the longer side 111f of the backwardly slanted L-shape in the first section 111c. Furthermore, the shorter side 111g of the backwardly slanted L-shape in the second section 111d and the shorter side 111e of the backwardly slanted L-shape in the first section 111c substantially point in the same direction as illustrated in FIG. 2C. The shorter side 111e of the backwardly slanted L-shape in the first section 111c of the line flow slot 111 is aligned to a direction of travel of the fishing line 108 from the fishing rod 101 to the spool 115 in the retrieve mode. More specifically, the portion of the line flow slot 111 along the shorter side 111e of the backwardly slanted L-shape in the first section 111c of the line flow slot 111 is aligned to the direction of travel of the fishing line 108 from the fishing rod 101 to the spool 115 in the retrieve mode. The fishing line 108 frictionlessly passes through the shorter side 111e of the backwardly slanted L-shape in the first section 111c, proximal to the first end 111a of the line flow slot 111. The shorter side 111g of the backwardly slanted L-shape in the second section 111d of the line flow slot 111 is aligned to a direction of travel of the fishing line 108 from the spool 115 to the fishing rod 101 in the cast mode. The fishing line 108 frictionlessly passes through the shorter side 111g of the backwardly slanted L-shape in the second section 111d in the cast mode. More specifically, the portion of the line flow slot 111 along the shorter side 111g of the backwardly slanted L-shape in the second section 111d of the line flow slot 111 is aligned to the direction of travel of the fishing line 108 from the spool 115 to the fishing rod 101 in the cast mode.

Figure 2D:
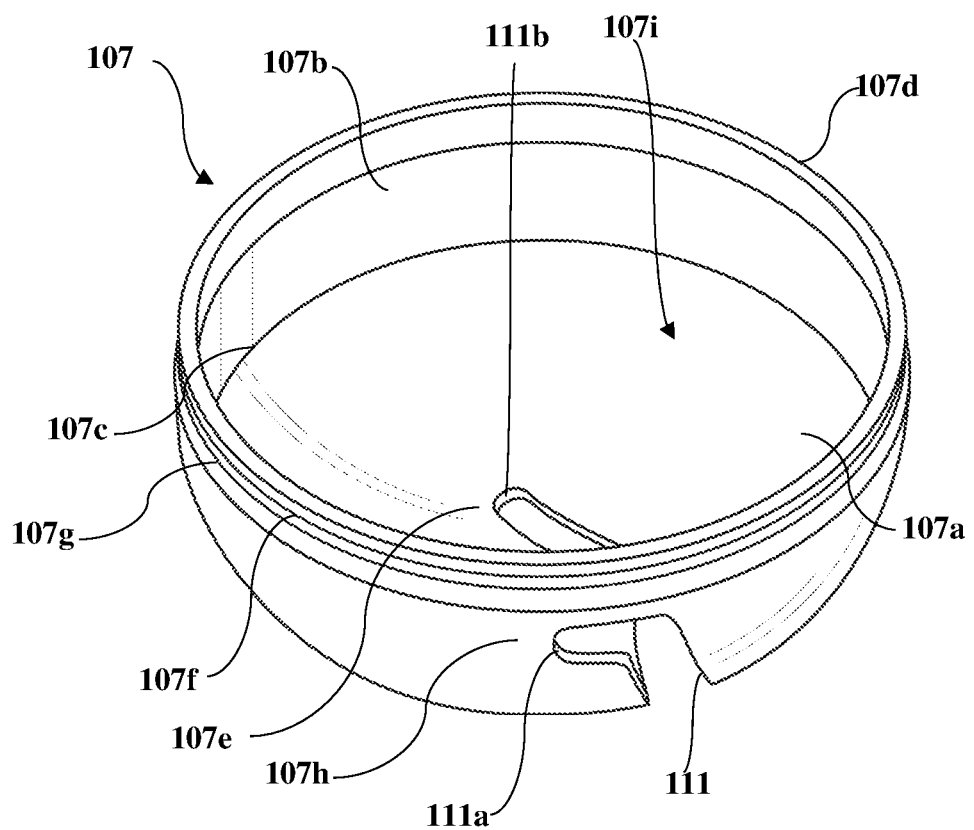
FIG. 2D exemplarily illustrates a bottom perspective view of the substantially hemispherical cap of the embodiment of the rotatable line transfer mechanism shown in FIGS. 1A-1B, showing a cavity defined in the substantially hemispherical cap.

FIG. 2D exemplarily illustrates a bottom perspective view of the substantially hemispherical cap 107 of the embodiment of the rotatable line transfer mechanism 105 shown in FIGS. 1A-1B, showing a cavity 107i defined in the substantially hemispherical cap 107. Also illustrated in FIG. 2D are the threads 107f configured on the outer bottom portion 107g of the wall 107b of the substantially hemispherical cap 107. Also illustrated in FIG. 2D is the line flow slot 111, the ends 111a and 111b of which are disposed at the mid-section 107h of the wall 107b and the apex 107e of the outwardly curved hemispherical upper section 107a, respectively.

Figure 2E:
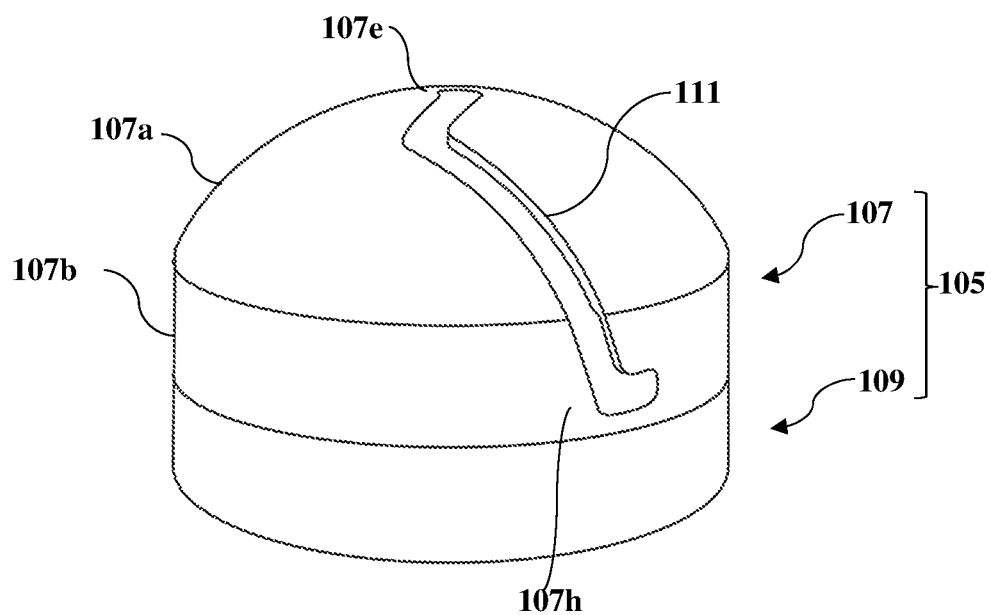
FIG. 2E exemplarily illustrates a perspective, assembled view of the embodiment of the rotatable line transfer mechanism shown in FIGS. 1A-1B, comprising the substantially hemispherical cap and the generally cylindrical receptacle.

FIG. 2E exemplarily illustrates a perspective, assembled view of the embodiment of the rotatable line transfer mechanism 105 shown in FIGS. 1A-1B, comprising the substantially hemispherical cap 107 and the generally cylindrical receptacle 109. The generally cylindrical receptacle 109 is part of the securing mechanism of the rotatable line transfer mechanism 105. As illustrated in FIG. 2E, the line flow slot 111 extends from the wall 107b to the apex 107e of the outwardly curved hemispherical upper section 107a of the substantially hemispherical cap 107.

Figure 2F:
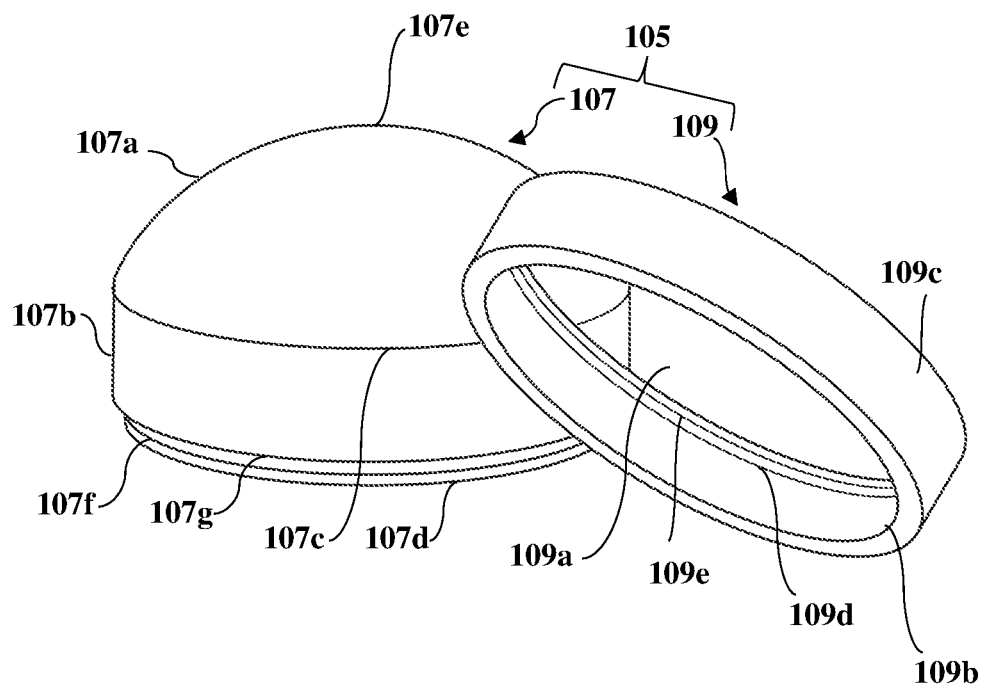
FIG. 2F exemplarily illustrates a perspective, disassembled view of the embodiment of the rotatable line transfer mechanism shown in FIG. 2E, showing threads on an outer bottom portion of a wall of the substantially hemispherical cap and threads on an inner top portion of the wall of the generally cylindrical receptacle.
Figure 2G:
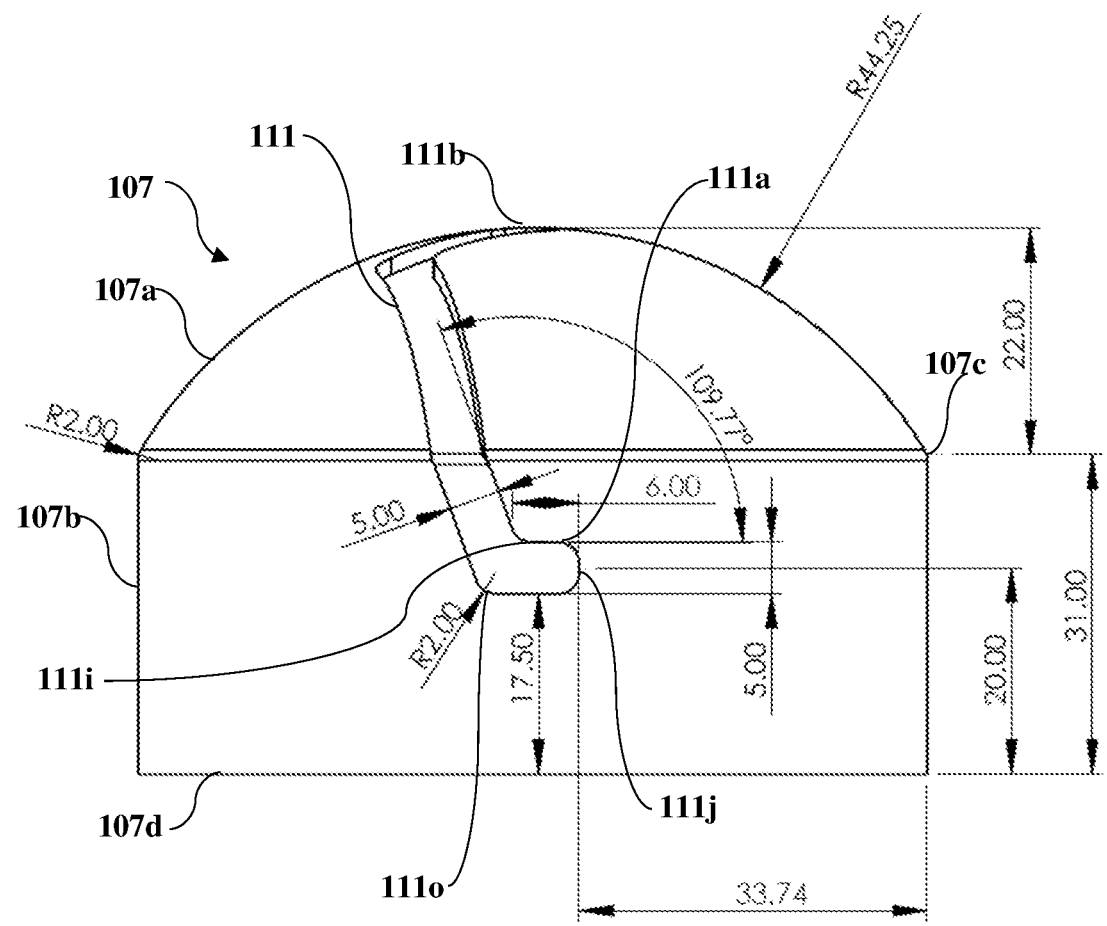
FIGS. 2G-2I exemplarily illustrate different views of the substantially hemispherical cap of the embodiment of the rotatable line transfer mechanism shown in FIGS. 1A-1B, showing exemplary dimensions of various portions of the substantially hemispherical cap.

FIG. 2F exemplarily illustrates a perspective, disassembled view of the embodiment of the rotatable line transfer mechanism 105 shown in FIG. 2E, showing threads 107f on the outer bottom portion 107g of the wall 107b of the substantially hemispherical cap 107 and threads 109e on the inner top portion 109d of the wall 109c of the generally cylindrical receptacle 109. The threads 109e on the inner top portion 109d of the wall 109c of the generally cylindrical receptacle 109 are configured to engage with the threads 107f on the outer bottom portion 107g of the wall 107b of the substantially hemispherical cap 107 to attach the generally cylindrical receptacle 109 to the substantially hemispherical cap 107.

Figure 2H:
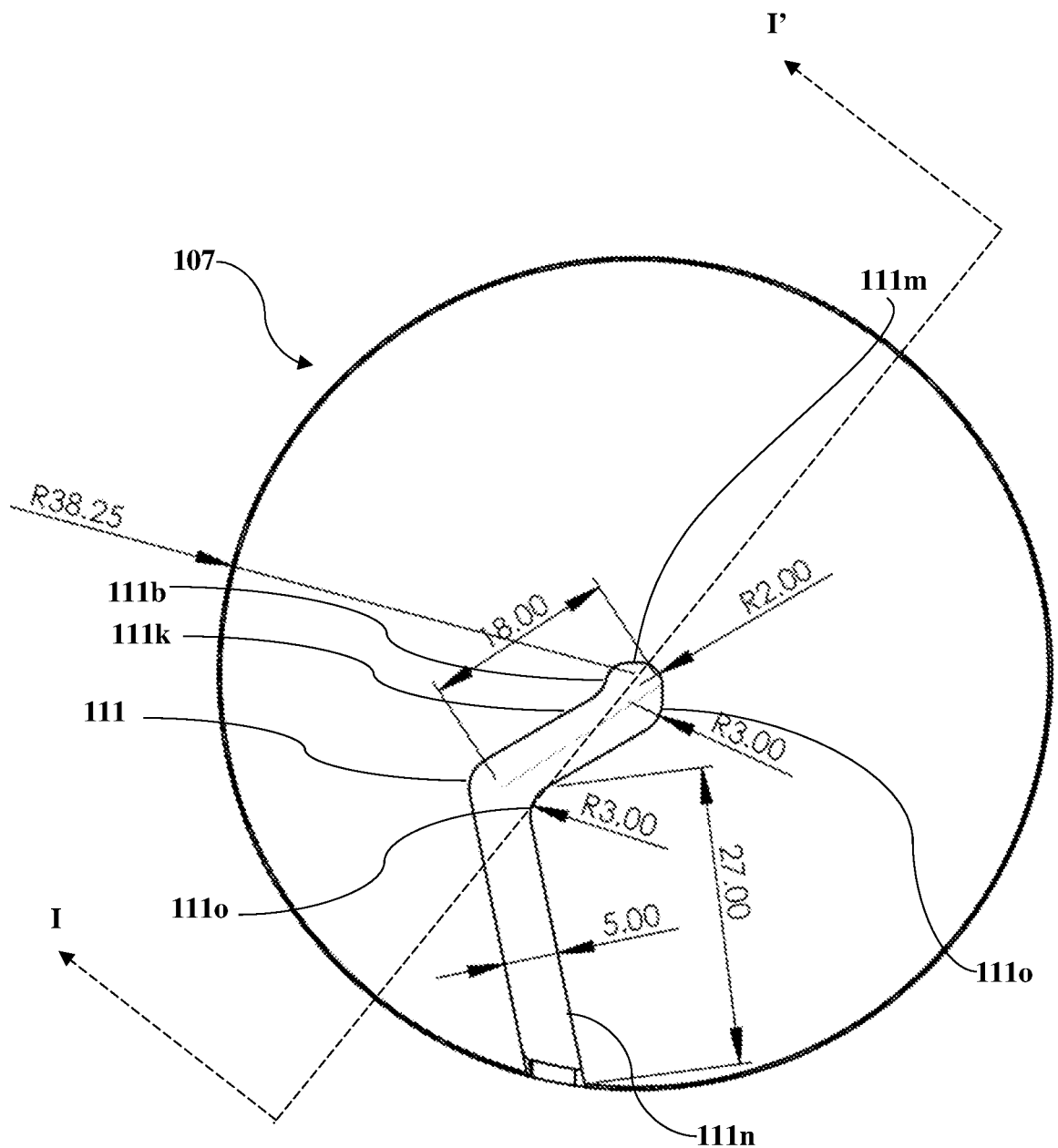
Figure 2I:
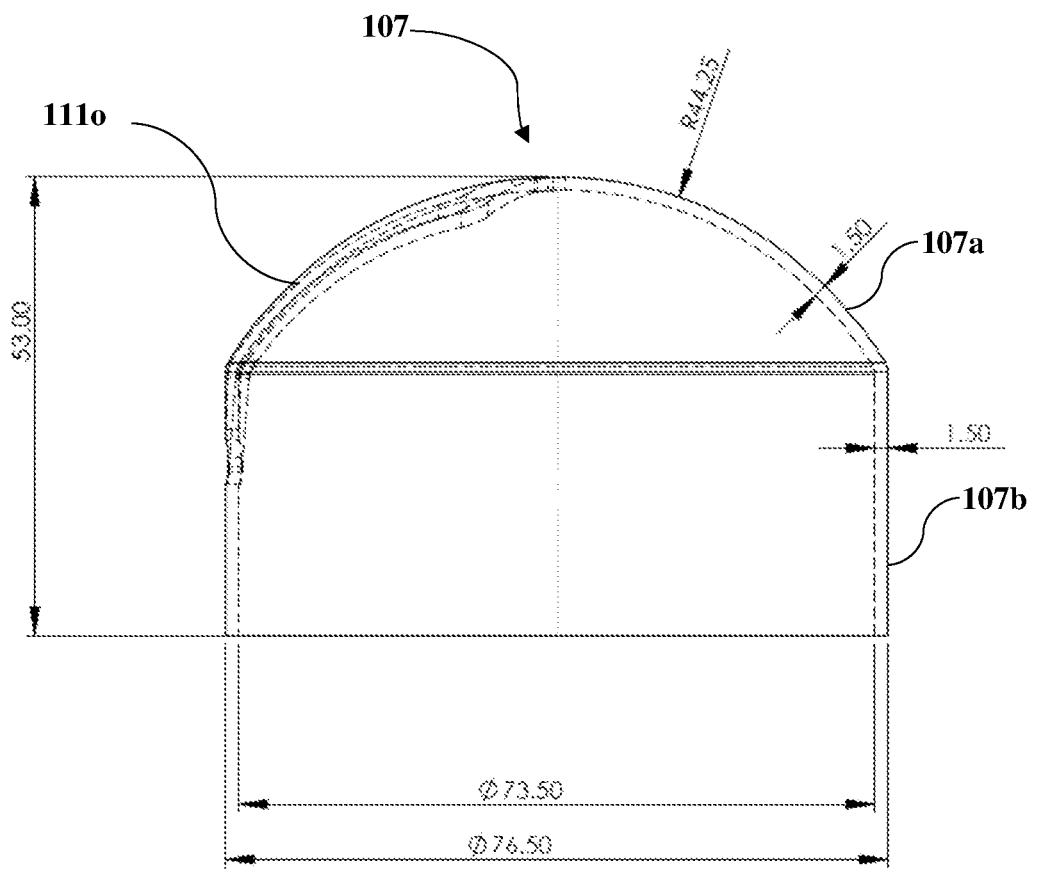

FIGS. 2G-2I exemplarily illustrate different views of the substantially hemispherical cap 107 of the embodiment of the rotatable line transfer mechanism 105 shown in FIGS. 1A-1B, showing exemplary dimensions of various portions of the substantially hemispherical cap 107. As illustrated in FIG. 2G, a radius of curvature of the outwardly curved hemispherical upper section 107a of the substantially hemispherical cap 107 is, for example, about 44.25 millimeters (mm). Height of the outwardly curved hemispherical upper section 107a from its boundary 107c is, for example, about 22 mm. The boundary 107c of the outwardly curved hemispherical upper section 107a also defines a radius of curvature of, for example, about 2 mm, as the boundary 107c transitions from the wall 107b to the outwardly curved hemispherical upper section 107a. In an embodiment, width of the line flow slot 111 is, for example, about 5 mm. A length of an upper portion 111i of the shorter side 111e of the backwardly slanted L-shape in the first section 111c of the line flow slot 111 illustrated in FIG. 2C, is, for example, about 6 mm. The shorter side 111e of the backwardly slanted L-shape in the first section 111c is disposed, for example, about 17.5 mm from the base 107d of the substantially hemispherical cap 107. The wall 107b of the outwardly curved hemispherical upper section 107a is, for example, about 31 mm in height. A tip 111j of the first end 111a of the line flow slot 111 is disposed, for example, about 20 mm from the base 107d of the substantially hemispherical cap 107, on the wall 107b of the substantially hemispherical cap 107.

As illustrated in FIG. 2H, a radius of the substantially hemispherical cap 107 is, for example, about 38.25 mm. A length of a lower portion 111k of the shorter side 111g of the backwardly slanted L-shape in the second section 111d of the line flow slot 111 illustrated in FIG. 2C, is, for example, about 18 mm. A radius of curvature of the supplementary rounded portion 111m at the second end 111b of the line flow slot 111 is, for example, about 2 mm. A length of an inner portion 111n of the longer side 111h of the backwardly slanted L-shape in the second section 111d of the line flow slot 111 illustrated in FIG. 2C, is, for example, about 27 mm. In an embodiment, the radius of curvature of bends 111o in the line flow slot 111 is, for example, from about 2 mm to about 3 mm, as illustrated in FIG. 2G and FIG. 2H. FIG. 2I illustrates a cross-sectional view of the substantially hemispherical cap 107, taken along a section I-I' shown in FIG. 2H. As illustrated in FIG. 2I, thickness of the substantially hemispherical cap 107 is, for example, about 1.5 mm, and height of the substantially hemispherical cap 107 is, for example, about 53 mm.

FIG. 3A exemplarily illustrates an exploded view of an embodiment of a fishing reel 100 comprising the embodiment of the rotatable line transfer mechanism 105 illustrated in FIGS. 1A-2F, showing a ring 113 suspended between the reel body 102 and the generally cylindrical receptacle 109. The function of the ring 113 of the rotatable line transfer mechanism 105 is disclosed in the description of FIGS. 3B-3D. The exploded view in FIG. 3A exemplarily illustrates the positions of the main components of the fishing reel 100, for example, the reel body 102, the spool 115, the rotatable line transfer mechanism 105, the turning handle 103, and the system 301 of gears accommodated in the reel body 102. Additional components typically incorporated in a fishing reel 100 for normal operation of the fishing reel 100, for example, additional springs, studs, knobs, washers, seals, spacers, gaskets, bearings, additional fasteners, etc., are not shown in the exploded view for simplicity and clarity of the main components. The fishing line 108 is wound around the spool 115. In an embodiment, the spool 115 is a skirted spool as exemplarily illustrated in FIG. 3A, configured to prevent the fishing line 108 from falling behind and under the spool 115. In an embodiment, the spool 115 comprises skirting 115b on one or both opposing ends 115c of the spool 115. In an embodiment, the diameter of the skirting 115b at a lower one of the opposing ends 115c is lesser than the diameter of the reel body 102. The skirting 115b prevents the fishing line 108 from falling behind and under the spool 115 in the cast mode and the retrieve mode. In an embodiment, the spool 115 comprises a low profile and tapered center attachment 115d to preclude the fishing line 108 from catching and entangling on the center attachment 115d. In an embodiment, the spool 115 is incorporated with a push button release member (not shown) instead of a threaded attachment for releasing the fishing line 108.

Figure 3C:
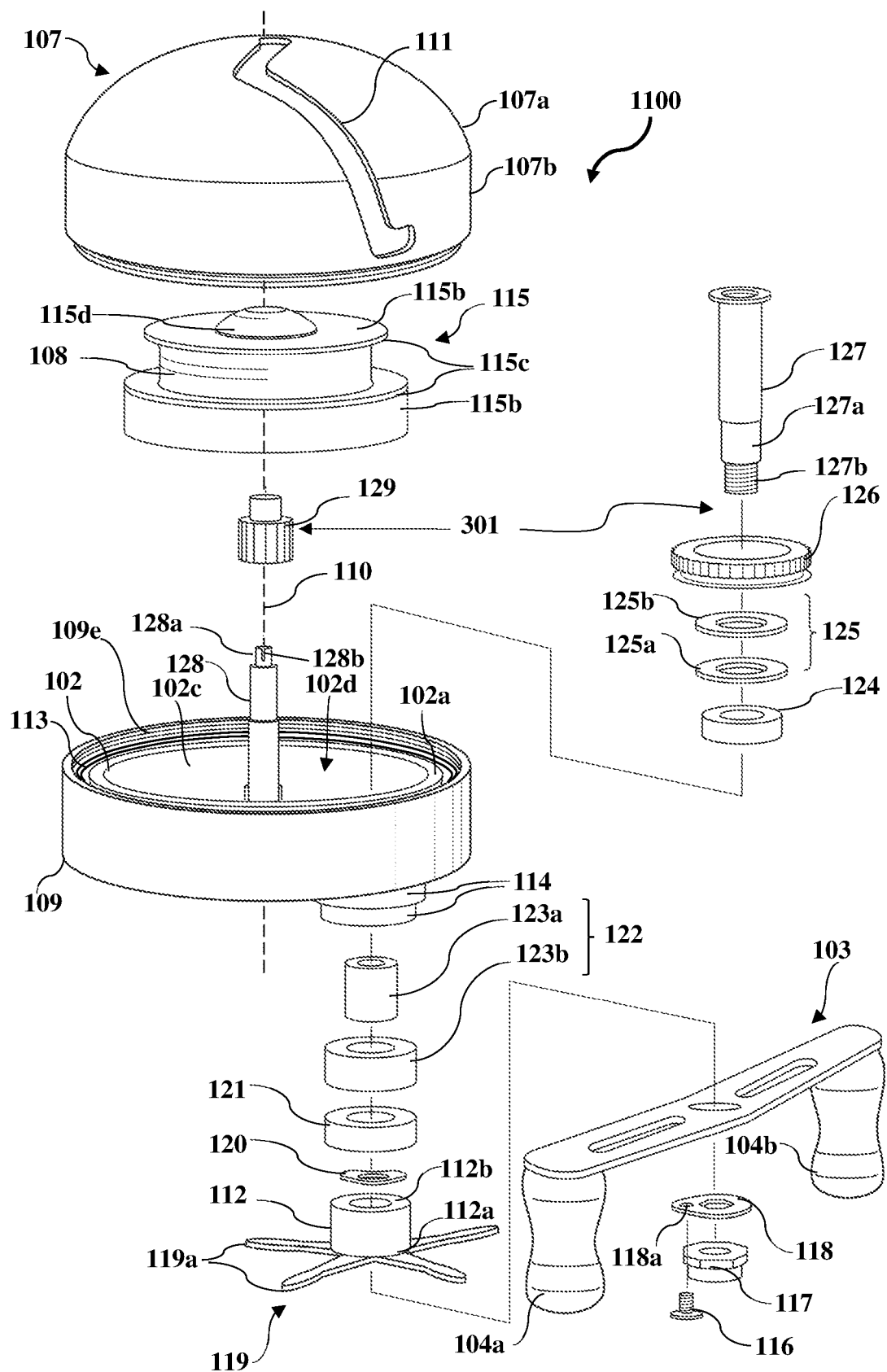
FIG. 3C exemplarily illustrates an exploded view of another embodiment of the fishing reel comprising the embodiment of the rotatable line transfer mechanism illustrated in FIGS. 1A-2F, showing the ring disposed between the reel body and the generally cylindrical receptacle.

The spool 115 is positioned just above the reel body 102. In an embodiment, the reel body 102 comprises a generally cylindrical wall 102c with the upper surface 102a that is open and a closed lower or bottom surface 102b. As shown in FIGS. 3A-3C, the generally cylindrical receptacle 109 is configured to be disposed underneath the reel body 102 of the fishing reel 100. The reel body 102 is rigidly attached to the generally cylindrical receptacle 109, for example, using an adhesive, screws (not shown), etc., to ensure that there is no free movement between the reel body 102 and the generally cylindrical receptacle 109. In an embodiment, the generally cylindrical receptacle 109 is integrated to the reel body 102 of the fishing reel 100 as illustrated in FIGS. 9-11.

The reel body 102 further defines a cavity 102d for accommodating the system 301 of gears. In an embodiment, the system 301 of gears comprises a main gear 126, a spool axle 128, a spool hub gear 129, a drive gear guide 127, and a ball bearing 124 as illustrated in FIG. 3A. In an embodiment, a slot 128b is configured on an upper end 128a of the spool axle 128 for attaching to the push button release member (not shown) of the spool 115. The spool hub gear 129 is operably and coaxially coupled to a lower end 128c of the spool axle 128 as illustrated in FIGS. 3A-3B and FIG. 9. The gears 126 and 129 are circular metallic components that sit in the reel body 102. The gears 126 and 129 are made, for example, from any one of zinc, brass, aluminum, stainless steel, etc. The main gear 126 is in engageable communication with the spool hub gear 129 as exemplarily illustrated in FIG. 3A and FIGS. 9-10. The main gear 126 drives the spool hub gear 129 and in turn the spool axle 128, which turns the spool 115. In an embodiment, the fishing reel 100 further comprises a standard adjustable friction drag system 125 built into the system 301 of gears as exemplarily illustrated in FIG. 3A. The drag system 125 comprises a set of metal and fabric washers 125a and 125b made, for example, from metal, felt, wool, wood, synthetic fluoropolymers, etc. The washers 125a and 125b of the drag system 125 serve to insulate, seal, lock, serve as spacers, provide spring force, align parts, and distribute loads in the system 301 of gears. The washers 125a and 125b of the drag system 125 are configured, for example, as flat discs stacked on top of each other, alternating between metal and fabric washers. In an embodiment as exemplarily illustrated in FIG. 3A, the drag system 125 comprises two washers, for example, a key washer 125a and a polytetrafluoroethylene (PTFE) washer 125b. The key washer 125a is configured to lock into a base material of the drag system 125 with its key to prevent rotation of the key washer 125a. The key washer 125a is made, for example, from cold rolled steel, stainless steel, etc. The PTFE washer 125b is a flat disc having antifriction properties, chemical resistance, and corrosion resistance. The PTFE washer 125b is, for example, a Teflon® washer of The Chemours Company FC, LLC.

Figure 9:
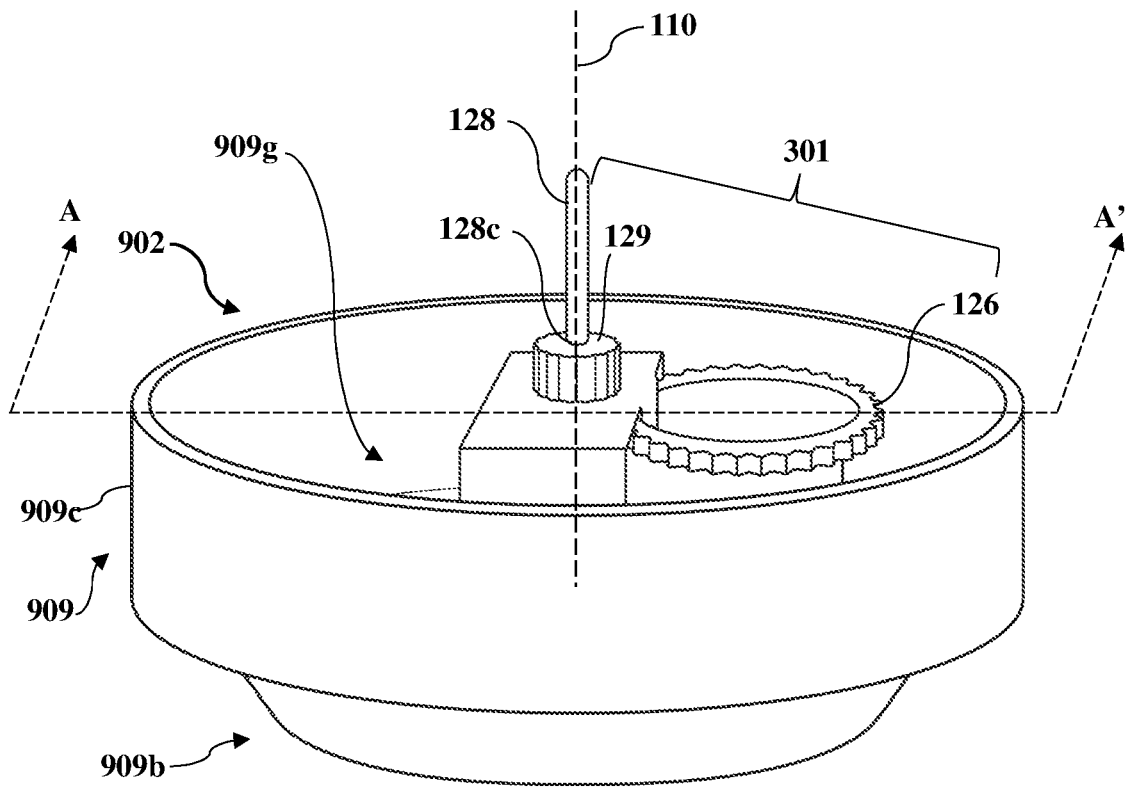
FIG. 9 exemplarily illustrates a perspective view showing an embodiment of the generally cylindrical receptacle integrated to the reel body of the fishing reel.
Figure 10:
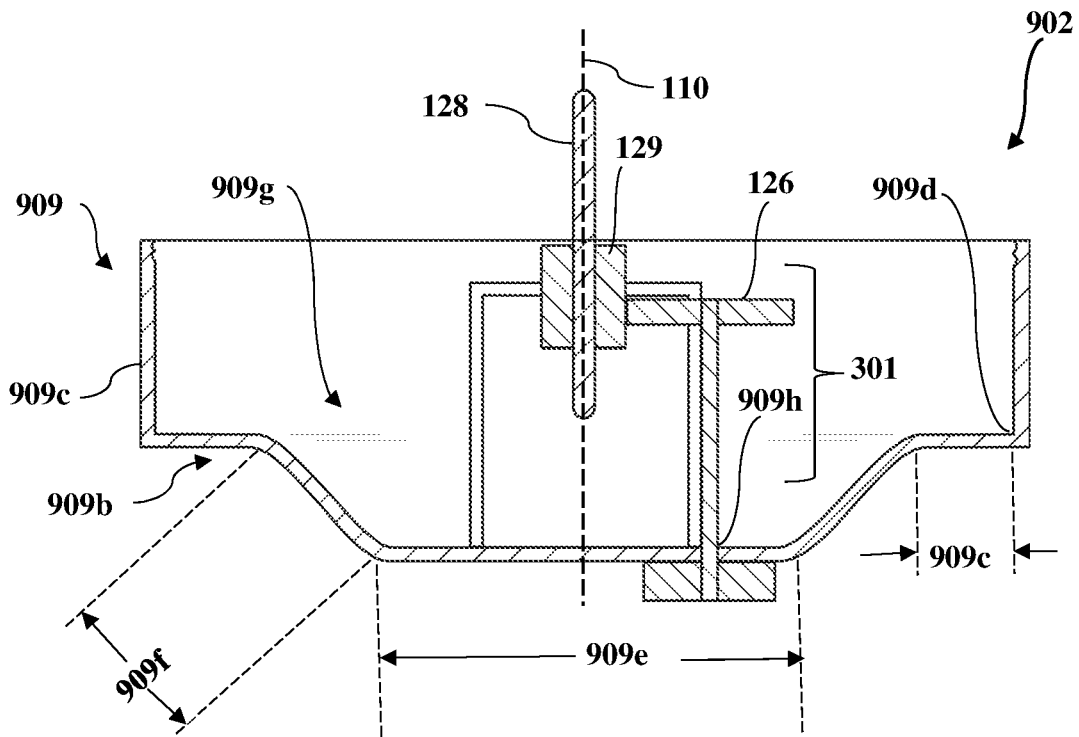
FIG. 10 exemplarily illustrates a cross-sectional view of the reel body with the integrated generally cylindrical receptacle, taken along a section A-A' shown in FIG. 9.
Figure 11:
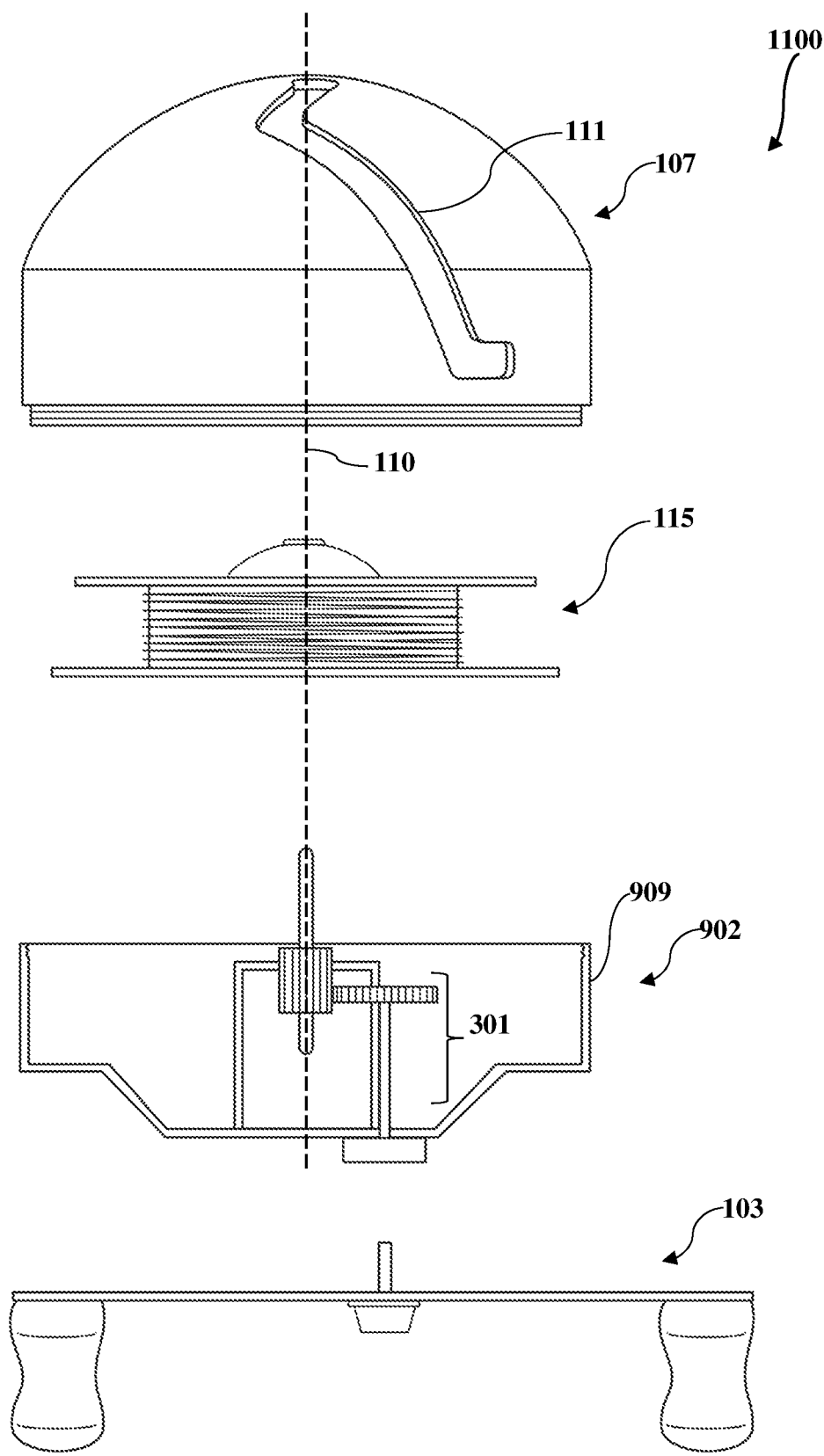
FIG. 11 exemplarily illustrates a partially assembled view of the embodiment of the fishing reel with the integrated generally cylindrical receptacle shown in FIGS. 9-10.

The washers 125a and 125b of the drag system 125 are stacked on and operably connected to the main gear 126, which is operably connected to the spool 115 as disclosed in the descriptions of FIGS. 9-11. The drag system 125 is in operable communication with an adjustable friction drag element 119. The washers 125a and 125b of the drag system 125 are configured to create friction and adjust an amount of drag on the fishing line 108 wound around the spool 115. The main gear 126, the drag system 125, and the ball bearing 124 are coaxially disposed around the drive gear guide 127. In an embodiment, a threaded section 127b is configured on a bottom end 127a of the drive gear guide 127. The threaded section 127b is configured to fasten the drive gear guide 127 to the main gear 126. The drive gear guide 127 and the ball bearing 124 guide and allow for smooth rotation of the main gear 126. The drive gear guide 127 guides the main gear 126 to engageably communicate with the spool hub gear 129.

The turning handle 103 is rotatably connected to the reel body 102 via the pivot 112 using a fastener, for example, a nut 117. In an embodiment, the fishing reel 100 further comprises a thin oval washer 118 with a hex hole configured to receive and firmly seat the nut 117 that connects the turning handle 103 to the reel body 102. In an embodiment, the thin oval washer 118 comprises an opening 118a for inserting a fastener 116, for example, a threaded screw, to attach the thin oval washer 118 to the turning handle 103. The fastener 116 secures the thin oval washer 118 and the nut 117 firmly to the turning handle 103. In an embodiment, the adjustable friction drag element 119 is externally connected to the turning handle 103 and internally connected to the drag system 125 built into the system 301 of gears accommodated in the reel body 102. In an embodiment, the adjustable friction drag element 119 is attached to one end 112a of the pivot 112 as exemplarily illustrated in FIG. 3A. The adjustable friction drag element 119 is configured to adjust an amount of drag on the fishing line 108, in operable communication with the drag system 125 in the reel body 102. In an embodiment, the adjustable friction drag element 119 is a friction drag adjustment wheel shaped, for example, as a star with spokes 119a configured to manually rotate the adjustable friction drag element 119 and adjust the amount of drag on the fishing line 108, in operable communication with the drag system 125 which is a part of the system 301 of gears.

In an embodiment, the fishing reel 100 further comprises a one-way directional bearing 122 installed in the system 301 of gears. The one-way directional bearing 122 is made, for example, from a metal alloy such as stainless steel. The one-way directional bearing 122 comprises mating bearings, for example, an inner ring 123a and an outer ring 123b as exemplarily illustrated in FIG. 3A. In an embodiment, the one-way directional bearing 122 is coaxially connected to the pivot 112 via a ball bearing 121 and a spring washer 120. The spring washer 120 is disposed on one end 112b of the pivot 112, below the ball bearing 121 as exemplarily illustrated in FIG. 3A. The one-way directional bearing 122 is configured as an anti-reverse mechanism for disallowing movement of the turning handle 103 in a reverse direction. The spring washer 120 is configured to increase pressure when the adjustable friction drag element 119 is tightened. The ball bearing 121 facilitates translation of rotation of the turning handle 103 into a smooth turning motion of the spool 115. When the fishing reel 100 is assembled, in an embodiment, the spring washer 120, the ball bearing 121, and the one-way directional bearing 122 are disposed inside the reel body 102 and concealed by a frame cover 114, while the pivot 112 is exposed as exemplarily illustrated in FIG. 3G.

FIG. 3B exemplarily illustrates a partially assembled view of an embodiment of the fishing reel 100, comprising the embodiment of the rotatable line transfer mechanism 105 illustrated in FIGS. 1A-2F. FIG. 3B also illustrates the generally cylindrical receptacle 109 of the rotatable line transfer mechanism 105 disposed underneath the reel body 102 of the fishing reel 100 to encapsulate the reel body 102. Also illustrated in FIG. 3B is the system 301 of gears comprising, for example, the spool hub gear 129, the spool axle 128, the main gear 126, etc., accommodated within the cavity 102d of the reel body 102.

Figure 3D:
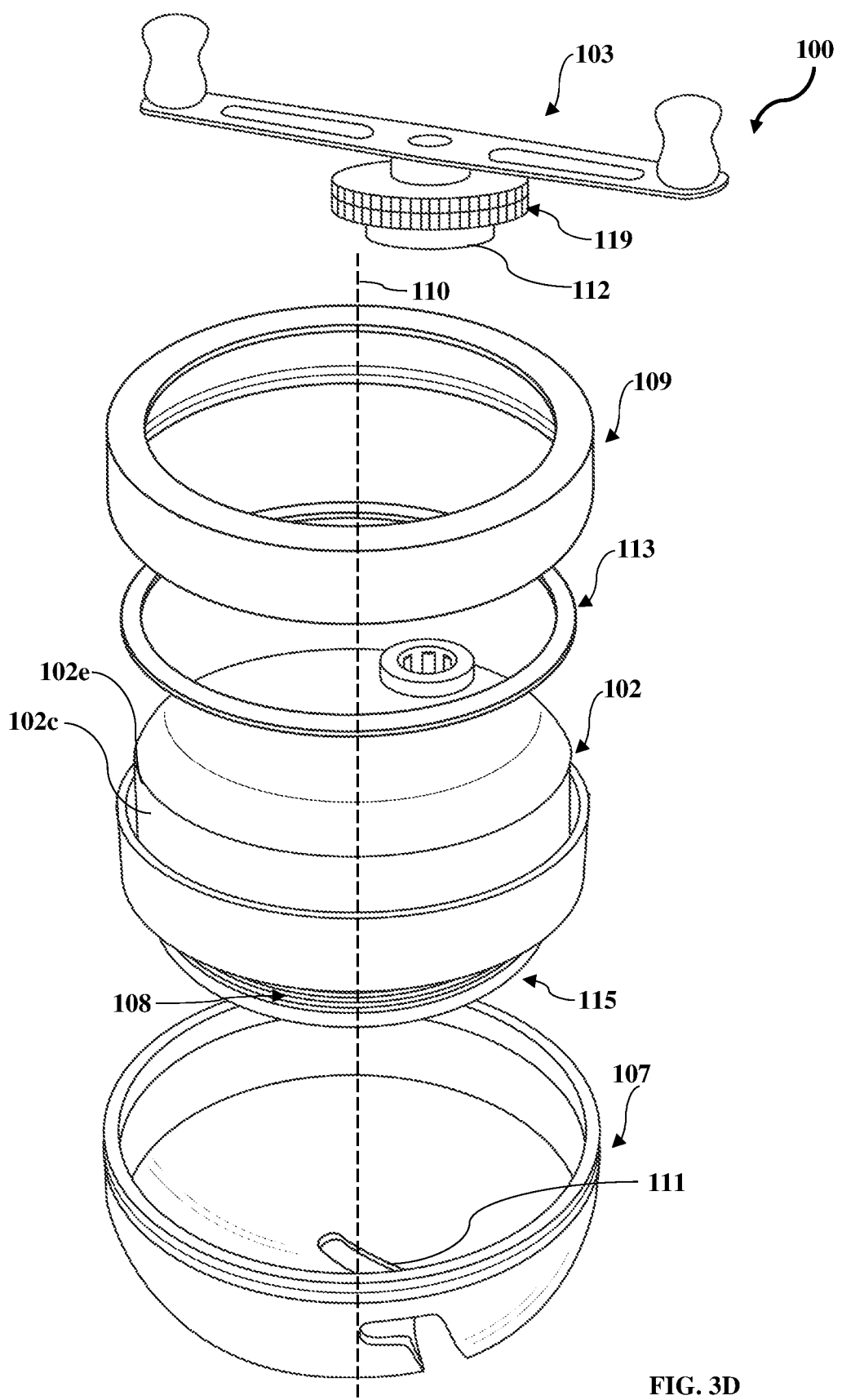
FIG. 3D exemplarily illustrates a bottom perspective, partially assembled view of the embodiment of the fishing reel shown in FIGS. 1A-1B, showing the ring suspended between the reel body and the generally cylindrical receptacle.
Figure 3E:
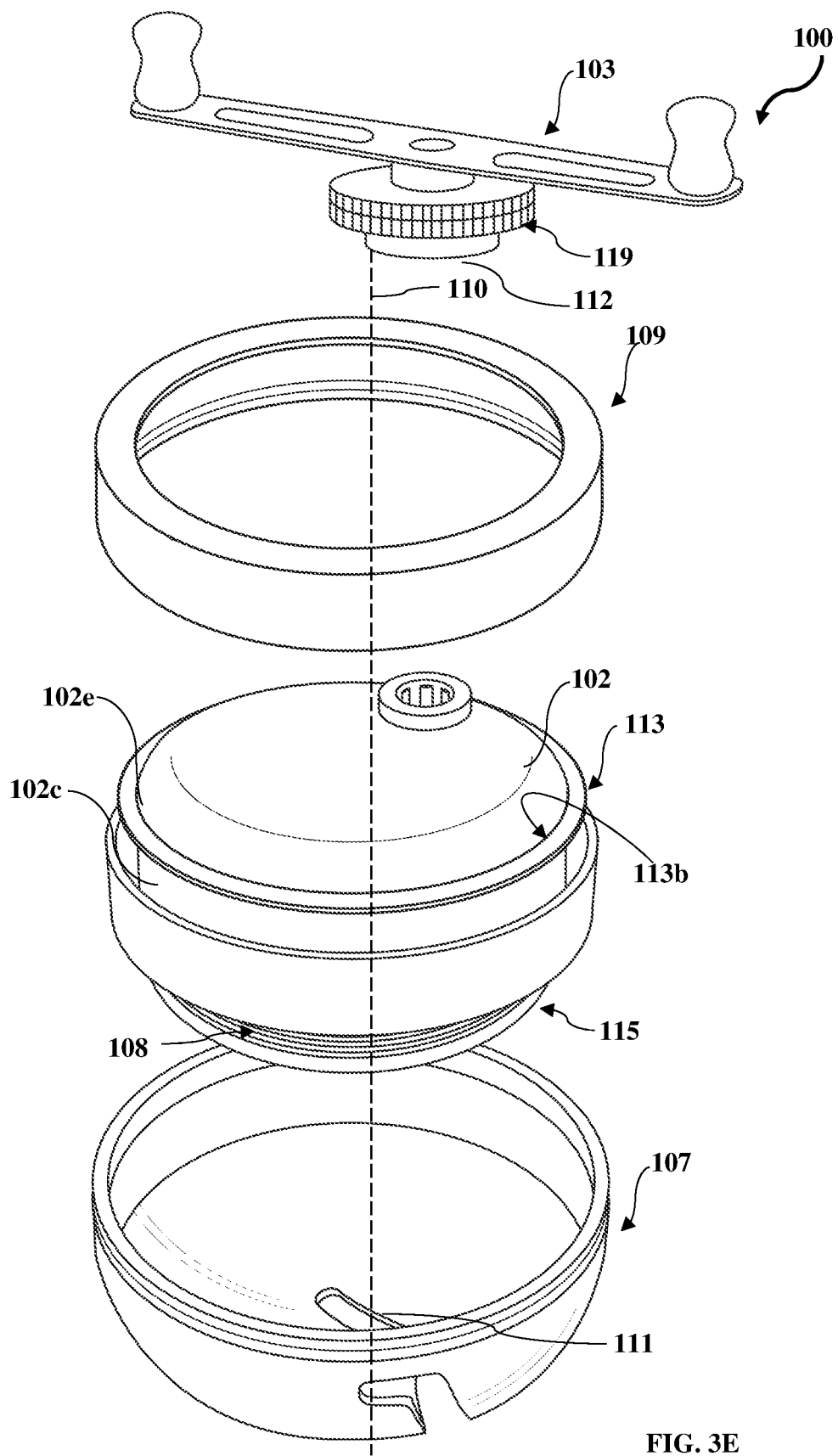
FIG. 3E exemplarily illustrates a bottom perspective, partially assembled view of the embodiment of the fishing reel shown in FIGS. 1A-1B, showing the ring attached to the reel body.
Figure 3F:
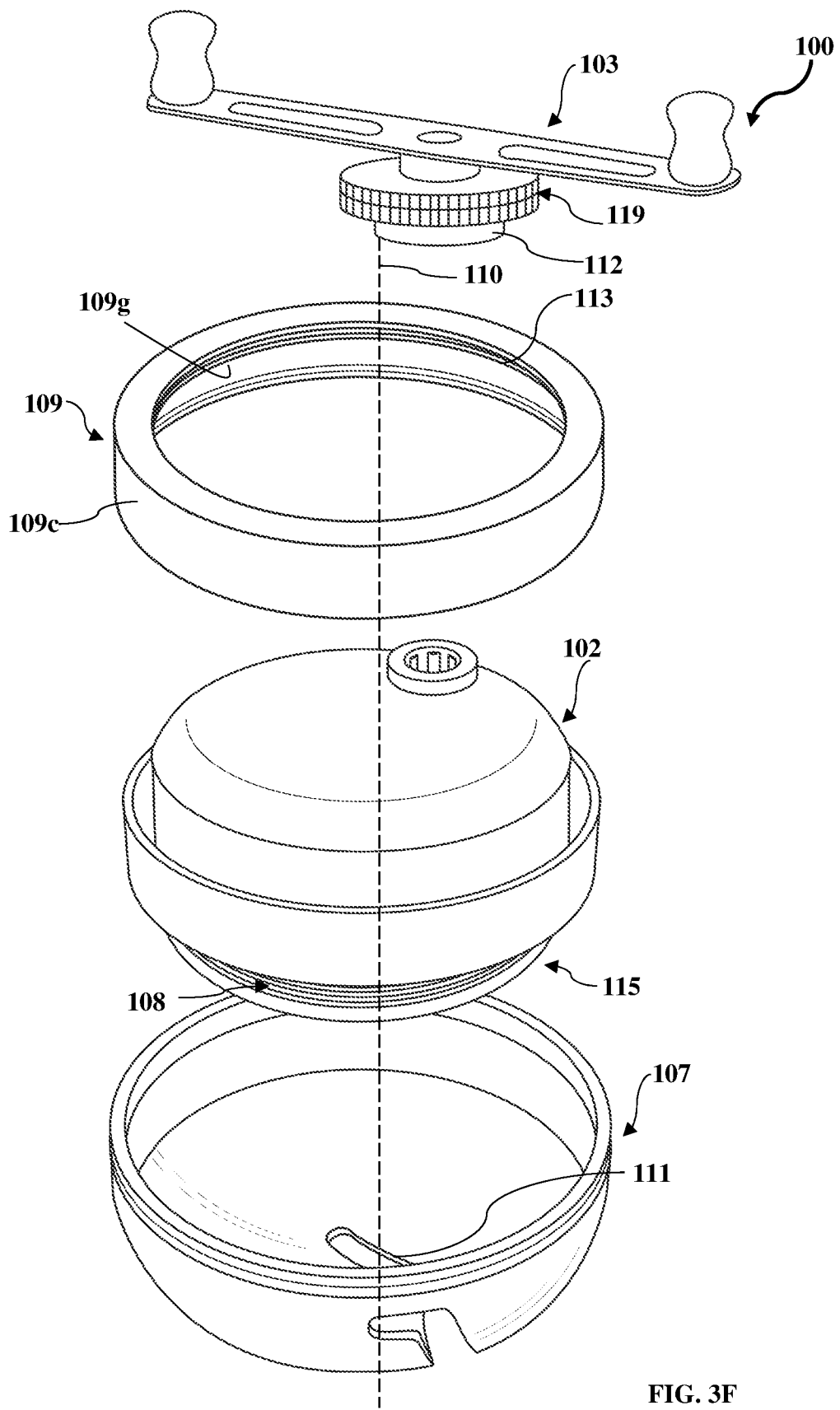
FIG. 3F exemplarily illustrates a bottom perspective, partially assembled view of the embodiment of the fishing reel shown in FIGS. 1A-1B, showing the ring attached to the generally cylindrical receptacle.

FIG. 3C exemplarily illustrates an exploded view of another embodiment of the fishing reel 100 comprising the embodiment of the rotatable line transfer mechanism 105 illustrated in FIGS. 1A-2F, showing the ring 113 disposed between the reel body 102 and the generally cylindrical receptacle 109. FIG. 3D exemplarily illustrates a bottom perspective, partially assembled view of the embodiment of the fishing reel 100 shown in FIGS. 1A-1B, showing the ring 113 suspended between the reel body 102 and the generally cylindrical receptacle 109. In an embodiment, the rotatable line transfer mechanism 105 further comprises the ring 113 as illustrated in FIGS. 3A-3F. The ring 113 is configured to be disposed between the generally cylindrical receptacle 109 and the reel body 102. In an embodiment, an outer diameter of the ring 113 is either less than or equal to an inner diameter of the wall 109c of the generally cylindrical receptacle 109. In an embodiment, the ring 113 is attached to the wall 109c of the generally cylindrical receptacle 109. For example, an outer perimeter 113a of the ring 113 is attached to an inner perimeter 109g of the wall 109c of the generally cylindrical receptacle 109 as illustrated in FIG. 3A and FIG. 3F. In another embodiment, the ring 113 is attached to the reel body 102. For example, an inner perimeter 113b of the ring 113 is attached to an outer perimeter 102e of the wall 102c of the reel body 102 as illustrated in FIG. 3A and FIG. 3E. The ring 113 is configured to hold the substantially hemispherical cap 107 rigidly in place on the reel body 102 when the substantially hemispherical cap 107 is disposed on the reel body 102 and attached to the generally cylindrical receptacle 109. In an embodiment, the substantially hemispherical cap 107 is attached to the generally cylindrical receptacle 109 using an adhesive. In another embodiment, the substantially hemispherical cap 107 is threadably engaged with the generally cylindrical receptacle 109 to attach the generally cylindrical receptacle 109 to the substantially hemispherical cap 107. In an embodiment, the ring 113 is made, for example, of plastic, metal, or an elastic material.

Figure 3G:
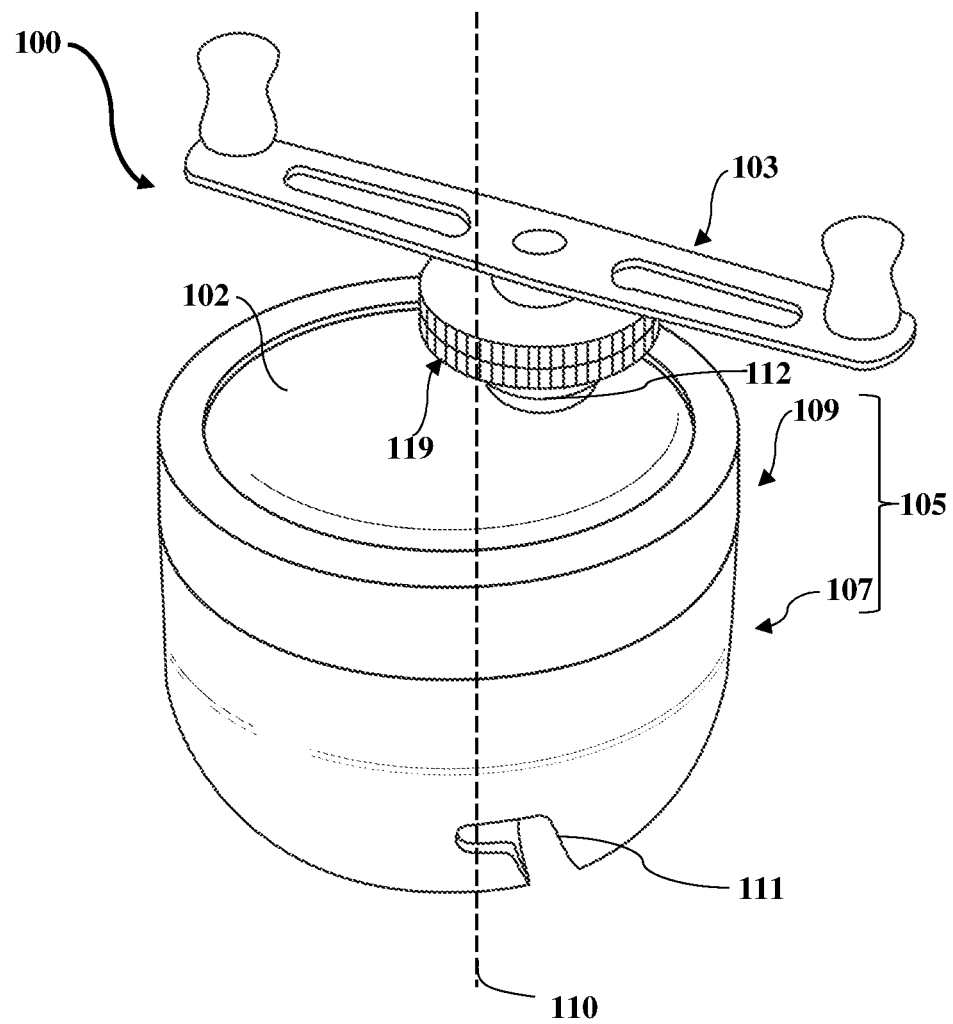
FIG. 3G exemplarily illustrates a bottom perspective, assembled view of the embodiment of the fishing reel shown in FIGS. 3A-3F.

FIG. 3E exemplarily illustrates a bottom perspective, partially assembled view of the embodiment of the fishing reel 100 shown in FIGS. 1A-1B, showing the ring 113 attached to the reel body 102. FIG. 3F exemplarily illustrates a bottom perspective, partially assembled view of the embodiment of the fishing reel 100 shown in FIGS. 1A-1B, showing the ring 113 attached to the generally cylindrical receptacle 109. FIG. 3G exemplarily illustrates a bottom perspective, assembled view of the embodiment of the fishing reel 100 shown in FIGS. 3A-3F. As illustrated in FIG. 3G, the substantially hemispherical cap 107 and the generally cylindrical receptacle 109 encapsulate the reel body 102 when the substantially hemispherical cap 107 is positioned over the spool 115 illustrated in FIGS. 3A-3F and attached to the generally cylindrical receptacle 109.

FIGS. 3D-3G and 8 also illustrate another embodiment of the adjustable friction drag element 119. In this embodiment, the adjustable friction drag element 119 is configured as a circular-shaped wheel that allows convenient handling and operation of the adjustable friction drag element 119 during fishing. The adjustable friction drag element 119 is coaxially connected between the turning handle 103 and the pivot 112. The adjustable friction drag element 119 rotates about the pivot 112.

Figure 4:
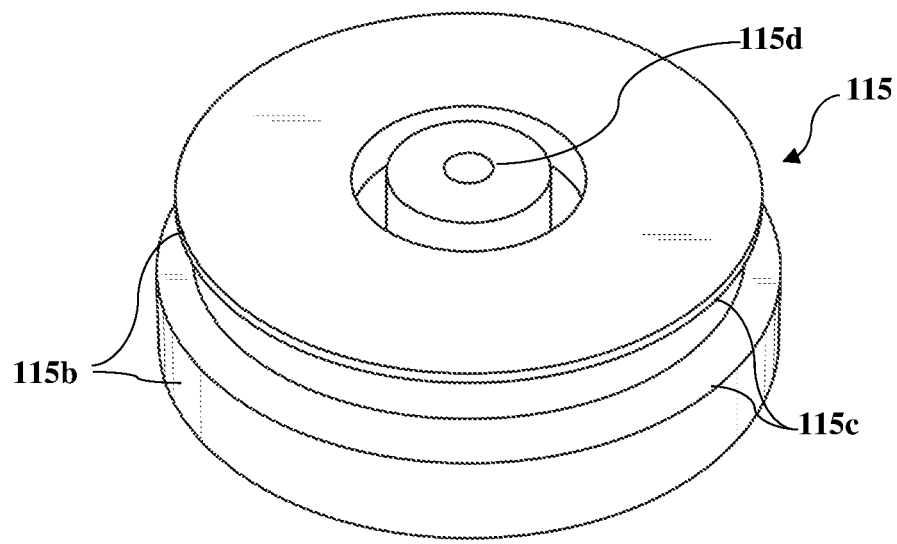
FIG. 4 exemplarily illustrates an embodiment of a spool configured to be disposed on the reel body of the fishing reel.

FIG. 4 exemplarily illustrates an embodiment of a spool 115 configured to be disposed on the reel body 102 of the fishing reel 100. In an embodiment as exemplarily illustrated in FIG. 4, the spool 115 is a skirted spool configured to prevent the fishing line 108 shown in FIGS. 3A-3F, that is wound around the spool 115, from falling behind and under the spool 115 in the cast mode and the retrieve mode. In an embodiment, the skirting 115b is provided on one or both the opposing ends 115c of the spool 115. In an embodiment, the center attachment 115d of the spool 115 is flat and not tapered as illustrated in FIG. 4, to preclude the fishing line 108 from catching and entangling on the center attachment 115d.

Figure 5A:
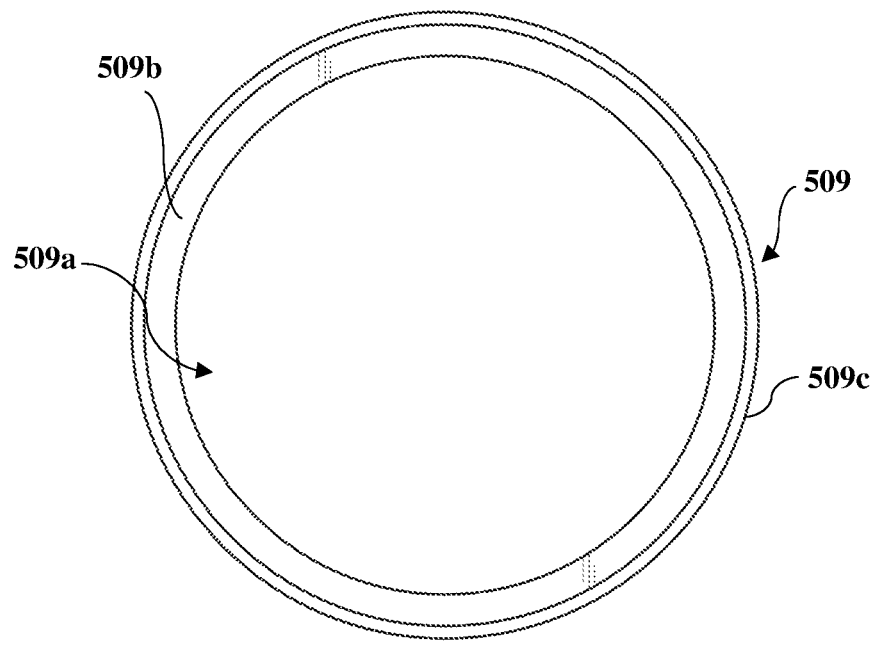
FIG. 5A exemplarily illustrates a top plan view of an embodiment of the generally cylindrical receptacle of the securing mechanism, without threads on the inner top portion of the wall of the generally cylindrical receptacle.
Figure 5B:
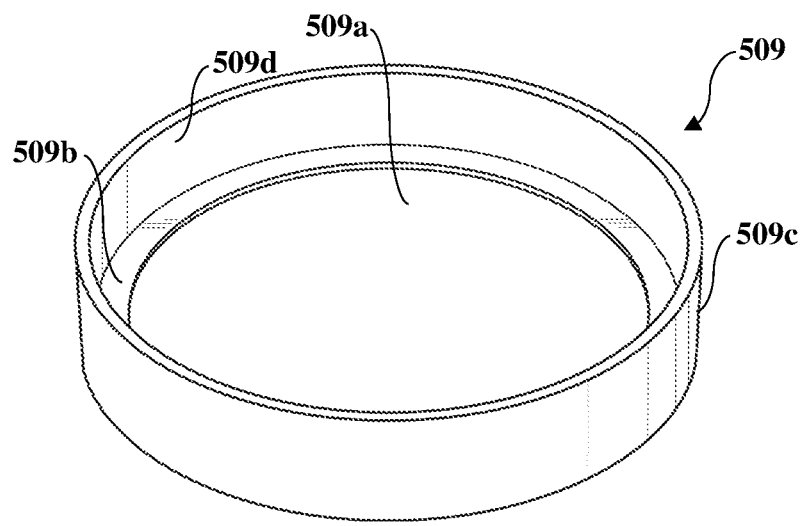
FIG. 5B exemplarily illustrates a perspective view of the embodiment of the generally cylindrical receptacle shown in FIG. 5A, without threads on the inner top portion of the wall of the generally cylindrical receptacle.

FIG. 5A exemplarily illustrates a top plan view of an embodiment of the generally cylindrical receptacle 509 of the securing mechanism, without threads on the inner top portion 509d of the wall 509c of the generally cylindrical receptacle 509. FIG. 5B exemplarily illustrates a perspective view of the embodiment of the generally cylindrical receptacle 509 shown in FIG. 5A, without threads on the inner top portion 509d of the wall 509c of the generally cylindrical receptacle 509. As illustrated in FIGS. 5A-5B, the generally cylindrical receptacle 509 comprises an annular opening 509a at a base 509b of the generally cylindrical receptacle 509. The annular opening 509a is substantially concentric with the generally cylindrical receptacle 509. Furthermore, a circumference of the annular opening 509a is less than a circumference of the generally cylindrical receptacle 509. Furthermore, the circumference of the annular opening 509a is less than a circumference of the spool 115 of the fishing reel 100 illustrated in FIG. 1B. The generally cylindrical receptacle 509 is configured to be attached to an embodiment of the substantially hemispherical cap (not shown) that also does not comprise threads on the outer bottom portion of the wall of the substantially hemispherical cap. The outer bottom portion of the wall of the embodiment of the substantially hemispherical cap is configured to fit into the inner top portion 509d of the wall 509c of the generally cylindrical receptacle 509. The embodiment of the outer bottom portion of the wall of the substantially hemispherical cap is recessed. In an embodiment, the generally cylindrical receptacle 509 has a larger diameter than the substantially hemispherical cap.

FIG. 6A exemplarily illustrates a top perspective view of a fishing reel 100 of a fishing rod 101 using the embodiment of the rotatable line transfer mechanism 105 shown in FIGS. 1A-3G, in a retrieve mode. FIG. 6B exemplarily illustrates a bottom perspective view of the fishing reel 100 of the fishing rod 101 shown in FIG. 6A.

FIG. 6C exemplarily illustrates a perspective view of the fishing reel 100 of the fishing rod 101 using the embodiment of the rotatable line transfer mechanism 105 shown in FIGS. 1A-3G, in a cast mode. To use the fishing reel 100 of the fishing rod 101 in the cast mode, an angler rotates the substantially hemispherical cap 107 in a counterclockwise direction, about the axis 110 of rotation of the spool 115, till the fishing line 108 slides into the second section 111d of the line flow slot 111 illustrated in FIG. 2A and FIG. 2C. The direction of the fishing line 108 towards the fishing rod 101 and slight tension of the fishing line 108 towards the fishing rod 101 causes the fishing line 108 to be disengaged from its current position in line flow slot 111 and slide into the rounded second end 111b in the second section 111d of the line flow slot 111. The fishing line 108 is then guided by the shorter side 111g of the backwardly slanted L-shape in the second section 111d of the line flow slot 111. In an embodiment, the angler rotates the substantially hemispherical cap 107 in the counterclockwise direction, about the axis 110 of rotation of the spool 115, till a protrusion 709g on the upper surface 709e of the wall 709c, as described in the descriptions of FIGS. 7A and 7B snap-fits into a notch 707f in the outer portion of the wall 107b of the substantially hemispherical cap 707. The notch 707f in the outer portion of the wall 107b and the protrusion 709g on the upper surface 709e of the wall 709c are positioned on the substantially hemispherical cap 107 and the generally cylindrical receptacle 109, respectively, to ensure that the substantially hemispherical cap 707 stops at the ideal position to configure the fishing rod 101 in the cast mode when the protrusion 709g on the upper surface 709e of the wall 709c snap-fits into the notch 707f in the outer portion of the wall 107b.

To use the fishing reel 100 of the fishing rod 101 in the retrieve mode, the angler rotates the substantially hemispherical cap 107 in the clockwise direction, about the axis 110 of rotation of the spool 115, till the fishing line 108 slides into the first section 111c of the line flow slot 111 illustrated in FIG. 2A and FIG. 2C. In an embodiment, the angler may further rotate the substantially hemispherical cap 107 in the clockwise direction, about the axis 110 of rotation of the spool 115 till the fishing line 108 slides onto the first end 111a in the first section 111c of the line flow slot 111 fishing line 108 is helped along the line flow slot 111 due to the slight tension on the line towards the fishing rod 101. In an embodiment, the angler rotates the substantially hemispherical cap 107 in the clockwise direction, about the axis 110 of rotation of the spool 115, till a protrusion 709f on the upper surface 709e of the wall 709c, as described in the descriptions of FIGS. 7A and 7B snap-fits into a notch 707g in the outer portion of the wall 107b of the substantially hemispherical cap 707. The notch 707f in the outer portion of the wall 107b and the protrusion 709f on the upper surface 709e of the wall 709c are positioned on the substantially hemispherical cap 107 and the generally cylindrical receptacle 109, respectively, to ensure that the substantially hemispherical cap 707 stops at the ideal position to configure the fishing rod 101 in the retrieve mode when the protrusion 709f on the upper surface 709e of the wall 709c snap-fits into the notch 707g in the outer portion of the wall 107b.

The technical advantage of sliding the fishing line in the line flow slot 111 from the first end 111a to the second end 111b is that it prevents twisting of the fishing line 108, thereby precluding entanglement of the fishing line 108.

Figure 7A:
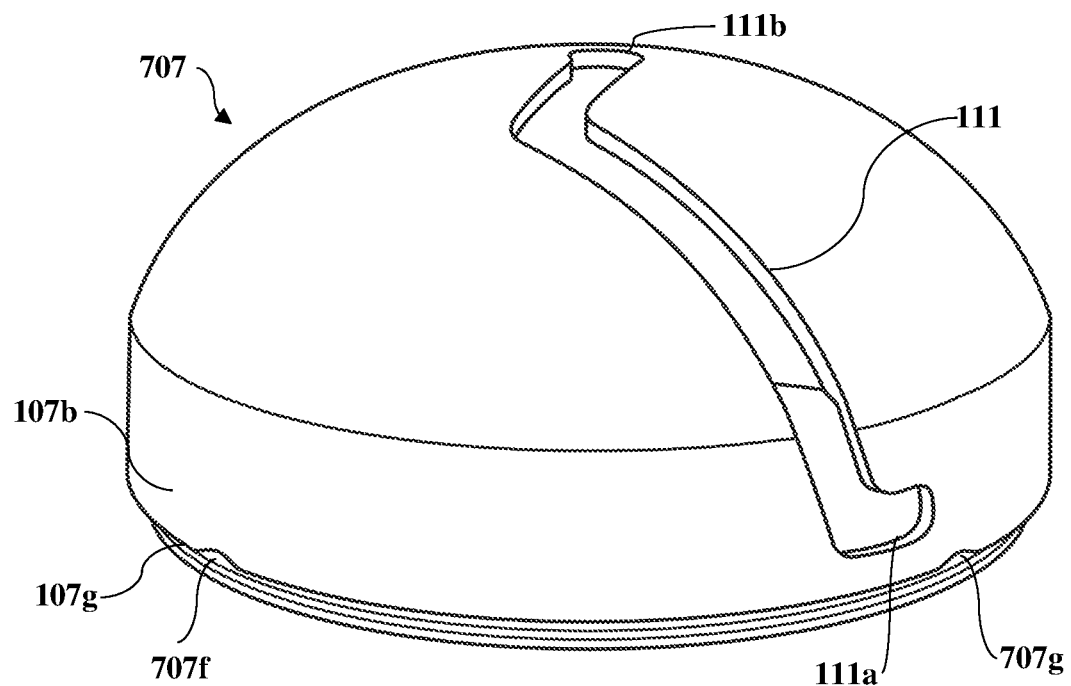
FIG. 7A exemplarily illustrates a top perspective view of another embodiment of the substantially hemispherical cap of the rotatable line transfer mechanism.

FIG. 7A exemplarily illustrates a top perspective view of another embodiment of the substantially hemispherical cap 707 of the rotatable line transfer mechanism. As illustrated in FIG. 7A, the outer portion of the wall 107b of the substantially hemispherical cap 707, just above the threaded outer bottom portion 107g of the wall 107b, comprises multiple notches 707f and 707g. In an embodiment, the notches 707f and 707g are equally spaced apart from each other.

Figure 7B:
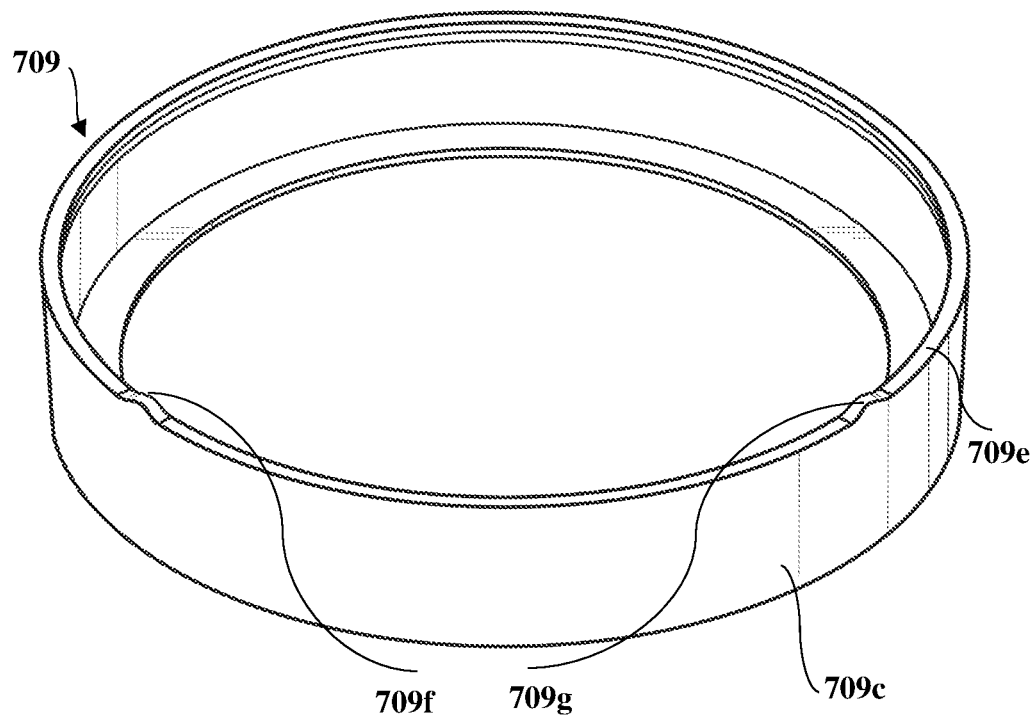
FIG. 7B exemplarily illustrates a top perspective view of another embodiment of the securing mechanism of the rotatable line transfer mechanism.

FIG. 7B exemplarily illustrates a top perspective view of another embodiment of the securing mechanism, that is, the generally cylindrical receptacle 709, of the rotatable line transfer mechanism. As illustrated in FIG. 7B, the upper surface 709e of the wall 709c comprises multiple protrusions 709f and 709g, each configured to snap-fit into one of the notches 707f or 707g in the outer portion of the wall 107b of the substantially hemispherical cap 707. The substantially hemispherical cap 707 illustrated in FIG. 7A, is locked onto the generally cylindrical receptacle 709 illustrated in FIG. 7B, when at least one of the protrusions 709f or 709g on the upper surface 709e of the wall 709c of the generally cylindrical receptacle 709 snap-fit into at least one of the notches 707f and 707g in the outer portion of the wall 107b of the substantially hemispherical cap 707. The notches 707f and 707g, and the protrusions 709f or 709g thereby provide a mechanism for selecting and locking onto the casting and retrieving positions of the substantially hemispherical cap 707. For example, turning the substantially hemispherical cap 707 in a counterclockwise direction to snap-fit at least one of the protrusions 709f or 709g of the generally cylindrical receptacle 709 into at least one of the notches 707f or 707g of the substantially hemispherical cap 707 helps the angler to select and lock onto the cast mode; and turning the substantially hemispherical cap 707 in a clockwise direction to snap-fit at least one of the protrusions 709f or 709g of the generally cylindrical receptacle 709 into at least one of the notches 707f or 707g of the substantially hemispherical cap 707 helps the angler to select and lock onto the retrieve mode. The angler may be required to turn the substantially hemispherical cap 707 just about a third of a turn to snap-fit at least one of the protrusions 709f or 709g into at least one of the notches 707f or 707g. As illustrated in FIG. 7B, a ring 113 shown in FIGS. 3A-3F, is not necessary to lock the generally cylindrical receptacle 709 to the substantially hemispherical cap 707.

The fishing line 108 with slight tension thereon travels the path of least resistance along the line flow slot 111, traveling in the direction desired which is determined by the angler who rotates the substantially hemispherical cap 707 and the line flow slot 111 therein between two desired positions for the cast mode and the retrieve mode. When the desired position of the substantially hemispherical cap 707 is reached, the rotation of the substantially hemispherical cap 707 is stopped by the snap-fit connection between at least one of the notches 707f or 707g in the outer portion of the wall 107b of the substantially hemispherical cap 707 and at least one of the protrusions 709f or 709g of the generally cylindrical receptacle 709. In the retrieve mode, the first end 111a of the line flow slot 111 is in the position of digit "1" of a clock, and the second end 111b of the line flow slot 111 is pointing towards position of digit "6" of the clock, which aligns the first end 111a of the line flow slot 111 to the top of the spool 115 where the fishing line 108 is entering the line flow slot 111 in a frictionless manner. From there, to bring the substantially hemispherical cap 707 to the cast mode, the substantially hemispherical cap 707 is rotated in a counterclockwise direction, for example, by approximately $\frac{1}{3}^{rd}$ of the way, to position the first end 111a of the line flow slot 111 in the position of digit "6" of the clock, and the second end 111b of the line flow slot 111 points towards position of digit "10" of the clock. Instead of rotating the substantially hemispherical cap 707, for example, by approximately $\frac{2}{3}^{rd}$ of the way in a clockwise direction, the substantially hemispherical cap 707 may be rotated, for example, just $\frac{1}{3}^{rd}$ of the way to bring the substantially hemispherical cap 707 to the cast mode.

Figure 8:
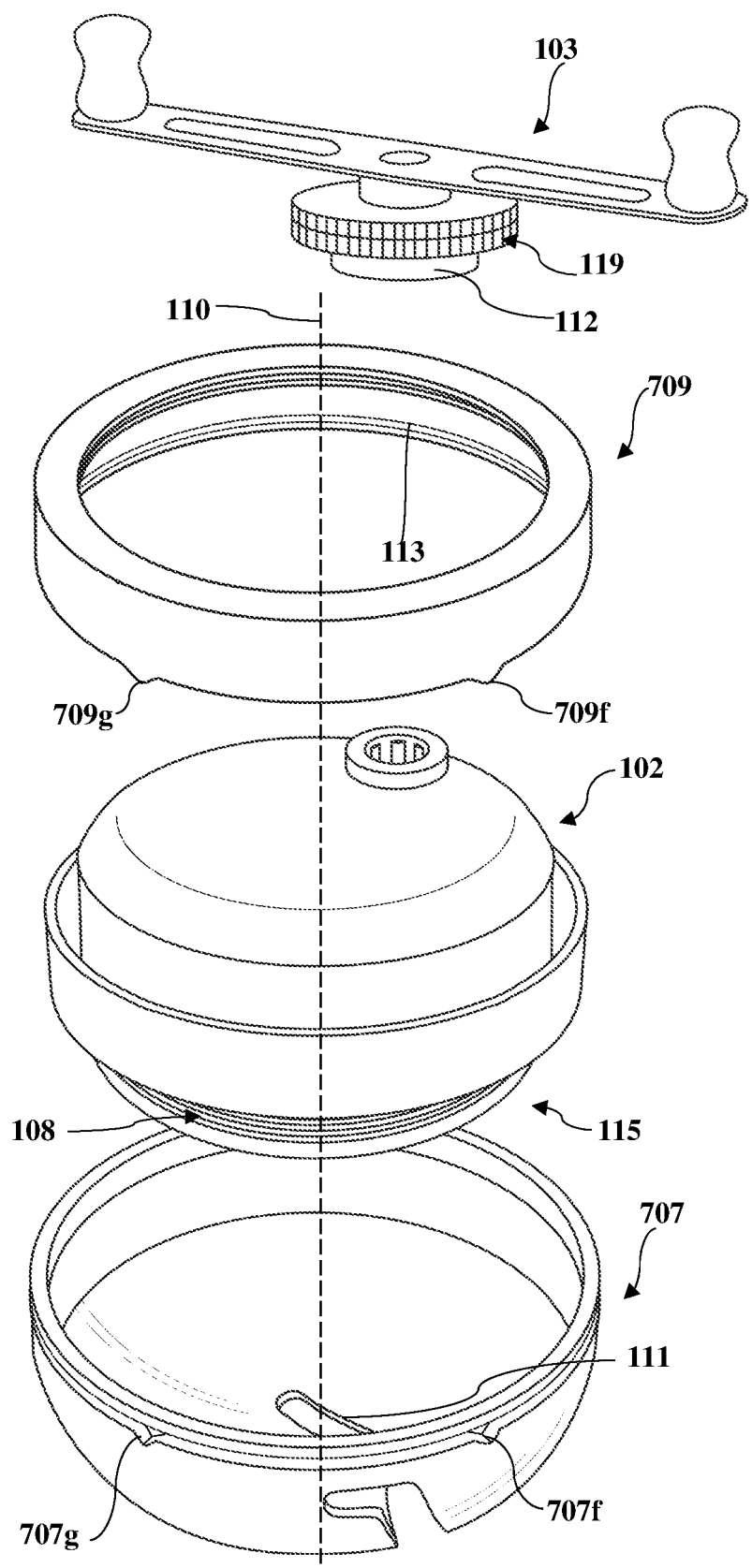
FIG. 8 exemplarily illustrates a bottom perspective, partially assembled view of the fishing reel comprising the embodiments of the substantially hemispherical cap and the securing mechanism of the rotatable line transfer mechanism shown in FIGS. 7A-7B, respectively.

FIG. 8 exemplarily illustrates a bottom perspective, partially assembled view of the fishing reel 100 comprising the embodiments of the substantially hemispherical cap 707 and the securing mechanism, that is, the generally cylindrical receptacle 709, of the rotatable line transfer mechanism shown in FIGS. 7A-7B, respectively. The substantially hemispherical cap 707 is attached to the generally cylindrical receptacle 709 for encapsulating the reel body 102 and the spool 115.

FIG. 9 exemplarily illustrates a perspective view showing an embodiment of the generally cylindrical receptacle 909 integrated to the reel body 902 of the fishing reel 1100. FIG. 10 exemplarily illustrates a cross-sectional view of the reel body 902 with the integrated generally cylindrical receptacle 909, taken along a section A-A' shown in FIG. 9. The integrated generally cylindrical receptacle 909 comprises a base 909b comprising an upper base portion 909c disposed proximal to a boundary 909d of the base 909b, a lower base portion 909e disposed at a center or a mid-section of the base 909b, and an inwardly tapering mid-section 909f disposed between the upper base portion 909c and the lower base portion 909e. The integrated generally cylindrical receptacle 909 further comprises a generally cylindrical wall 909c surrounding the boundary 909d of the base 909b. The integrated generally cylindrical receptacle 909 further comprises a cavity 909g defined by the base 909b and the generally cylindrical wall 909c. The cavity 909g of the integrated generally cylindrical receptacle 909 is configured to accommodate the system 301 of gears of the fishing reel 1100. The integrated generally cylindrical receptacle 909 further comprises an opening 909h configured in the lower base portion 909e of the base 909b, proximal to the inwardly tapering mid-section 909f of the base 909b, to accommodate an axle of one of the gears, for example, the main gear 126, in the system 301 of gears. FIG. 11 exemplarily illustrates a partially assembled view of the embodiment of the fishing reel 1100 with the integrated generally cylindrical receptacle 909 shown in FIGS. 9-10.

Disclosed herein is also a rotatable line transfer mechanism 105 configured to direct winding and unwinding of a line, for example, a fishing line 108, to and from a spool 115 as illustrated in FIGS. 1A-1B. The rotatable line transfer mechanism 105 comprises a substantially hemispherical cap 107 comprising an outwardly curved hemispherical upper section 107a and a wall 107b extending vertically downwards from a boundary 107c of the outwardly curved hemispherical upper section 107a. The substantially hemispherical cap 107 comprises a line flow slot 111 extending from the wall 107b to an apex 107e of the outwardly curved hemispherical upper section 107a as illustrated in FIG. 2A. The rotatable line transfer mechanism 105 further comprises a securing mechanism 109 configured to be attached to the substantially hemispherical cap 107 to rotatably secure the substantially hemispherical cap 107 to a reel body 102 as illustrated in FIG. 1B. The rotatable line transfer mechanism 105 is configured to be rotated about an axis 110 of rotation of the spool 115 in a first direction, for example, a clockwise direction, to position the line 108 in the first end 111a of the line flow slot 111 for winding the line 108 onto the spool 115. The rotatable line transfer mechanism 105 is further configured to be rotated about the axis 110 of rotation of the spool 115 in a second direction opposite to the first direction, to position the line 108 in the second end 111b of the line flow slot 111 for unwinding the line 108 from the spool 115. The second direction is, for example, a counterclockwise direction. The line flow slot 111 is configured to allow the spool 115 to unwind in the second direction in a free flow manner. Furthermore, positioning the line 108 in the second end 111b of the line flow slot 111 allows the line 108 to be substantially frictionlessly unwound from the spool 115. The manner of directing the line 108 from being wound to the spool 115 in a direction perpendicular to the axis 110 of rotation of the spool 115, in the retrieve mode, to directing the line 108 to unwind from the spool 115 in a direction along the axis 110 of the spool 115 in the cast mode allows a substantially frictionless exiting of the line 108 from the spool 115 through the line flow slot 111. This is achieved and maintained by an operator of the rotatable line transfer mechanism 105. The operator achieves this method of directing the line 108 by rotating the rotatable line transfer mechanism 105 within its two determined stops at each direction to cause the movement of the line 108 traveling within the line flow slot 111 from one desired direction to a direction perpendicular to the desired direction.

The foregoing examples and illustrative implementations of various embodiments have been provided merely for explanation and are in no way to be construed as limiting of the embodiments disclosed herein. Dimensions of various parts of the fishing reel 100 and the rotatable line transfer mechanism 105 disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A rotatable line transfer mechanism for a fishing reel, comprising:
   a substantially hemispherical cap comprising an outwardly curved hemispherical upper section and a wall extending vertically downwards from a boundary of the outwardly curved hemispherical upper section, wherein the substantially hemispherical cap comprises a line flow slot extending from the wall to an apex of the outwardly curved hemispherical upper section, wherein the line flow slot is configured to receive and pass a fishing line from and to a spool, and wherein the substantially hemispherical cap comprises a cavity configured to partially encapsulate the spool; and
   a securing mechanism configured to be attached to the substantially hemispherical cap to rotatably secure the substantially hemispherical cap to a reel body of the fishing reel;
   wherein said rotatable line transfer mechanism is configured to be rotated about an axis of rotation of the spool in a first direction to position the fishing line in a first end of the line flow slot during a retrieve mode, and in a second direction opposite to the first direction to position the fishing line in a second end of the line flow slot during a cast mode.

2. The rotatable line transfer mechanism of claim 1, wherein the securing mechanism comprises a generally cylindrical receptacle configured to be disposed underneath the reel body of the fishing reel, and wherein the substantially hemispherical cap and the generally cylindrical receptacle are configured to encapsulate the reel body and the spool when the substantially hemispherical cap is positioned over the spool and attached to the generally cylindrical receptacle.

3. The rotatable line transfer mechanism of claim 2, wherein an inner top portion of the wall of the generally cylindrical receptacle comprises threads sized and configured to interact with threads configured on an outer bottom portion of the wall of the substantially hemispherical cap, wherein the threads on the inner top portion of the wall of the generally cylindrical receptacle are configured to cooperate mechanically with the threads on the outer bottom portion of the wall of the substantially hemispherical cap to thread the substantially hemispherical cap onto the generally cylindrical receptacle and effect a secure attachment between the substantially hemispherical cap and the generally cylindrical receptacle.

4. The rotatable line transfer mechanism of claim 3, wherein an outer portion of the wall of the substantially hemispherical cap, just above the threaded outer bottom portion of the wall, comprises a plurality of notches, wherein an upper surface of the wall of the generally cylindrical receptacle comprises a plurality of protrusions, each configured to snap-fit into one of the notches in the outer portion of the wall of the substantially hemispherical cap, and wherein the substantially hemispherical cap is configured to lock onto the generally cylindrical receptacle when at least one of the protrusions on the upper surface of the wall of the generally cylindrical receptacle snap-fits into at least one of the notches in the outer portion of the wall of the substantially hemispherical cap.

5. The rotatable line transfer mechanism of claim 2, wherein the generally cylindrical receptacle comprises an annular opening at a base of the generally cylindrical receptacle, wherein the annular opening is substantially concentric with the generally cylindrical receptacle, and wherein a circumference of the annular opening is less than a circumference of the generally cylindrical receptacle, and wherein the circumference of the annular opening is less than a circumference of the spool.

6. The rotatable line transfer mechanism of claim 5, wherein the generally cylindrical receptacle comprises a wall surrounding the base of the generally cylindrical receptacle.

7. The rotatable line transfer mechanism of claim 6, further comprising a ring configured to be disposed between the generally cylindrical receptacle and the reel body, wherein an outer diameter of the ring is one of less than and equal to an inner diameter of the wall of the generally cylindrical receptacle.

8. The rotatable line transfer mechanism of claim 7, wherein an outer perimeter of the ring is attached to an inner perimeter of the wall of the generally cylindrical receptacle.

9. The rotatable line transfer mechanism of claim 7, wherein an inner perimeter of the ring is attached to an outer perimeter of the reel body.

10. The rotatable line transfer mechanism of claim 1, wherein the line flow slot extends from a mid-section of the wall of the substantially hemispherical cap to the apex of the outwardly curved hemispherical upper section of the substantially hemispherical cap.

11. The rotatable line transfer mechanism of claim 10, wherein the line flow slot comprises a first section extending from the mid-section of the wall to the boundary of the outwardly curved hemispherical upper section and defining a backwardly slanted L-shape, and wherein the line flow slot further comprises a second section extending from the apex of the outwardly curved hemispherical upper section to the boundary of the outwardly curved hemispherical upper section and defining an inverted backwardly slanted L-shape, and wherein the first end of the line flow slot is disposed in the first section of the line flow slot and the second end of the line flow slot is disposed in the second section of the line flow slot, wherein a shorter side of the backwardly slanted L-shape in the first section of the line flow slot is aligned to a direction of travel of the fishing line from a fishing rod to the spool in the retrieve mode, wherein the fishing line frictionlessly passes through the shorter side of the backwardly slanted L-shape in the first section, proximal to the first end of the line flow slot in the retrieve mode, wherein a shorter side of the backwardly slanted L-shape in the second section of the line flow slot is aligned to a direction of travel of the fishing line from the spool to the fishing rod in the cast mode, and wherein the fishing line frictionlessly passes through the shorter side of the backwardly slanted L-shape in the second section in the cast mode.

12. The rotatable line transfer mechanism of claim 1, wherein the first end and the second end of the line flow slot are rounded.

13. The rotatable line transfer mechanism of claim 1, wherein the securing mechanism comprises a generally cylindrical receptacle integrated to the reel body of the fishing reel.

14. The rotatable line transfer mechanism of claim 13, wherein the generally cylindrical receptacle that is integrated to the reel body comprises:
a base comprising an upper base portion disposed proximal to a boundary of the base, a lower base portion disposed at a mid-section of the base, and an inwardly tapering mid-section located between the upper base portion and the lower base portion;
a generally cylindrical wall surrounding the boundary of the base;
a cavity defined by the base and the generally cylindrical wall and configured to accommodate a system of gears of the fishing reel; and
an opening configured in the lower base portion of the base, proximal to the inwardly tapering mid-section of the base, to accommodate a gear axle of the system of gears.

15. A rotatable line transfer mechanism for directing winding and unwinding of a line to and from a spool, the rotatable line transfer mechanism comprising:
a substantially hemispherical cap comprising an outwardly curved hemispherical upper section and a wall extending vertically downwards from a boundary of the outwardly curved hemispherical upper section, wherein the substantially hemispherical cap comprises a line flow slot extending from the wall to an apex of the outwardly curved hemispherical upper section; and
a securing mechanism configured to be attached to the substantially hemispherical cap to rotatably secure the substantially hemispherical cap to a reel body;
wherein said rotatable line transfer mechanism is configured to be rotated about an axis of rotation of the spool in a first direction, to position the line in a first end of the line flow slot for winding the line onto the spool; and
wherein said rotatable line transfer mechanism is further configured to be rotated about the axis of rotation of the spool in a second direction opposite to the first direction, to position the line in a second end of the line flow slot for unwinding the line from the spool.

16. The rotatable line transfer mechanism of claim 15, wherein the line flow slot is configured to allow the spool to unwind in the second direction in a free flow manner.

17. The rotatable line transfer mechanism of claim 15, wherein positioning the line in the second end of the line flow slot allows the line to be substantially frictionlessly unwound from the spool.

18. The rotatable line transfer mechanism of claim 15, wherein the line flow slot extends from a mid-section of the wall of the substantially hemispherical cap to the apex of the outwardly curved hemispherical upper section of the substantially hemispherical cap.

* * * * *